US008496484B2

(12) United States Patent
Setty

(10) Patent No.: US 8,496,484 B2
(45) Date of Patent: Jul. 30, 2013

(54) GAMES-BASED LEARNING

(75) Inventor: David Setty, Crosby (GB)

(73) Assignee: ITI Scotland Limited, Glasgow (GB)

( * ) Notice: Subject to any disclaimer, the term of this patent is extended or adjusted under 35 U.S.C. 154(b) by 842 days.

(21) Appl. No.: 11/810,299

(22) Filed: Jun. 4, 2007

(65) Prior Publication Data

US 2008/0045286 A1 Feb. 21, 2008

(30) Foreign Application Priority Data

Aug. 15, 2006 (GB) .................................. 0616107.9

(51) Int. Cl.
*G09B 25/00* (2006.01)

(52) U.S. Cl.
USPC ........................... 434/365; 434/322; 434/323

(58) Field of Classification Search
USPC .................. 434/322, 323, 350, 365
See application file for complete search history.

(56) References Cited

U.S. PATENT DOCUMENTS

| | | | |
|---|---|---|---|
| 4,538,994 A | 9/1985 | Suzuki et al. | |
| 4,545,767 A | 10/1985 | Suzuki et al. | |
| 5,174,759 A | 12/1992 | Preston et al. | |
| 6,159,014 A | 12/2000 | Jenkins et al. | |
| 6,386,883 B2 | 5/2002 | Siefert | |
| 6,470,170 B1 * | 10/2002 | Chen et al. | 434/350 |
| 6,477,437 B1 | 11/2002 | Hirota | |
| 6,559,867 B1 | 5/2003 | Kotick et al. | |
| 6,606,480 B1 | 8/2003 | L'Allier et al. | |
| 6,652,376 B1 | 11/2003 | Yoshida et al. | |
| 6,658,398 B1 * | 12/2003 | Bertrand et al. | 706/47 |
| 6,785,824 B1 * | 8/2004 | Grassle | 726/30 |
| 6,807,535 B2 | 10/2004 | Goodkovsky | |
| 6,808,392 B1 | 10/2004 | Walton | |
| 6,975,833 B2 | 12/2005 | Theilmann et al. | |
| 8,016,678 B1 * | 9/2011 | Hutter et al. | 463/42 |
| 2001/0034016 A1 * | 10/2001 | Ziv-el et al. | 434/350 |
| 2001/0039002 A1 | 11/2001 | Delehanty | |
| 2001/0049084 A1 | 12/2001 | Mitry | |
| 2002/0091608 A1 * | 7/2002 | Odegaard et al. | 705/36 |

(Continued)

FOREIGN PATENT DOCUMENTS

| | | |
|---|---|---|
| EP | 0399667 | 4/1990 |
| EP | 0483991 | 12/1996 |

(Continued)

OTHER PUBLICATIONS

Virtools SA: "Virtools™ Dev"[Online] 16 Mar. 2006, pp. 1-2, XP002458824 Retrieved from the Internet: URL:http://web.archive.org/web/20060316085629/www.virtools.com/solutions/products/pd fs/VirtoolsDev_3.pdf> [retrieved on Nov. 16, 2007].

(Continued)

*Primary Examiner* — Xuan Thai
*Assistant Examiner* — Bruck Gebremichael
(74) *Attorney, Agent, or Firm* — Drinker Biddle & Reath LLP

(57) ABSTRACT

A system for games-based learning is disclosed. In one preferred embodiment the system includes a learning application for execution by a player for the assessment of a learning objective, and a learning objective controller for selecting one or more measured objectives; defining outcome conditions for the measured objectives; and selecting outcome activities that each invoke a command in the learning application. A method is also disclosed for defining a learning objective for assessment in a learning application.

59 Claims, 17 Drawing Sheets

U.S. PATENT DOCUMENTS

| | | | |
|---|---|---|---|
| 2002/0098468 A1* | 7/2002 | Barrett et al. | 434/322 |
| 2002/0138456 A1 | 9/2002 | Levy et al. | |
| 2002/0182571 A1 | 12/2002 | McCormick et al. | |
| 2003/0039949 A1 | 2/2003 | Cappellucci et al. | |
| 2003/0044761 A1 | 3/2003 | Houlihan et al. | |
| 2003/0055800 A1 | 3/2003 | Geoghegan | |
| 2003/0064812 A1 | 4/2003 | Rappaport et al. | |
| 2003/0087223 A1* | 5/2003 | Walker et al. | 434/353 |
| 2003/0207243 A1* | 11/2003 | Shen et al. | 434/322 |
| 2004/0002039 A1 | 1/2004 | Draper et al. | |
| 2004/0009461 A1 | 1/2004 | Snyder et al. | |
| 2004/0029633 A1 | 2/2004 | Wen et al. | |
| 2004/0081953 A1* | 4/2004 | Murphy | 434/350 |
| 2004/0180317 A1* | 9/2004 | Bodner et al. | 434/353 |
| 2004/0219504 A1 | 11/2004 | Hattie | |
| 2005/0095569 A1 | 5/2005 | Franklin | |
| 2005/0123892 A1 | 6/2005 | Cornelius et al. | |
| 2005/0153267 A1 | 7/2005 | Goldman et al. | |
| 2005/0186550 A1 | 8/2005 | Gillani | |
| 2005/0203767 A1* | 9/2005 | Rogan et al. | 705/1 |
| 2005/0216506 A1 | 9/2005 | Theilmann et al. | |
| 2005/0221268 A1 | 10/2005 | Chaar et al. | |
| 2005/0233810 A1 | 10/2005 | Chiang | |
| 2005/0245303 A1 | 11/2005 | Graepel et al. | |
| 2005/0266906 A1 | 12/2005 | Stevens | |
| 2005/0266907 A1* | 12/2005 | Weston et al. | 463/1 |
| 2006/0024654 A1 | 2/2006 | Goodkovsky | |
| 2006/0078863 A1* | 4/2006 | Coleman et al. | 434/322 |
| 2006/0115802 A1* | 6/2006 | Reynolds | 434/236 |
| 2006/0147890 A1 | 7/2006 | Bradford et al. | |
| 2006/0188860 A1* | 8/2006 | Morrison | 434/322 |
| 2006/0263756 A1* | 11/2006 | Berger et al. | 434/323 |
| 2008/0014569 A1* | 1/2008 | Holiday et al. | 434/351 |
| 2008/0026359 A1* | 1/2008 | O'Malley | 434/323 |
| 2008/0050715 A1* | 2/2008 | Golczewski et al. | 434/350 |

FOREIGN PATENT DOCUMENTS

| | | |
|---|---|---|
| EP | 1383066 | 1/2004 |
| EP | 1208554 | 6/2006 |
| JP | 4097270 | 4/2001 |
| JP | 2001117905 | 4/2001 |
| JP | 2002273049 | 9/2002 |
| JP | 2003029614 | 1/2003 |
| JP | 2005103104 | 4/2005 |
| WO | WO98/52175 | 11/1998 |
| WO | WO00/13158 | 3/2000 |
| WO | WO01/42915 | 6/2001 |
| WO | WO01/95291 | 12/2001 |
| WO | WO03/042955 | 5/2003 |
| WO | WO03/054832 | 7/2003 |
| WO | WO2004/023428 | 3/2004 |
| WO | WO2004/023430 | 3/2004 |

OTHER PUBLICATIONS

Virtools SA: "Virtools Dev"[Online] Mar. 16, 2006, pp. 1-4, XP-002458825 Retrieved from the Internet: URL: http://web.archive.org/web/20060316080213/www.virtools.com/solutions/products/virtools_dev_featurees.asp> [retrieved on Nov. 16, 2007].
ITI Techmedia: "Delivering Innovation to Industry"[Online] May 14, 2006, pp. 1-24, XP-002458826 Retrieved from the Internet: URL: http://web.archive.org/web/20060514023114/http://www.ititechmedia.com/uploads/documents/Games_Based_Learning_Information_Pack_for_web.pdf> [retrieved on Nov. 14, 2007].

* cited by examiner

GAMES-BASED LEARNING

FIELD OF THE INVENTION

The present invention relates to games-based learning (GBL), and in particular to a method of assessment of performance in a games based learning platform.

BACKGROUND

In the prior art, assessment of a player in a game is well known, for leisure and learning applications. However, there is no way of assessing a player in a game based learning environment whereby the characteristics of the player can be assessed across different game environments and for different learning objectives.

SUMMARY OF THE INVENTION

A GBL platform is a software platform to support the creation, configuration and execution of applications that have an emphasis on learning, formed using an existing game engine and learning extensions.

A software development kit (SDK) is provided to give a collection of software tools and libraries used by designers to develop a learning application.

According to a first aspect of the present invention there is provided a system for games-based learning, comprising:
 a learning application for execution by a player for the assessment of a learning objective, said learning application comprising one or more measured objectives formed from a related group of learning application measurements; and
 a learning objective controller, comprising means for selecting one or more measured objectives; defining outcome conditions for the measured objectives; and selecting outcome activities that each invoke a command in the learning application.

According to a second aspect of the invention, there is provided a games-based learning application for execution on a player computer comprising one or more measured objectives formed from a related group of learning application measurements; said learning application being adapted for the assessment of a learning objective, said learning objective being formed from:
 the selection of one or more measured objectives;
 defined outcome conditions for the measured objectives; and
 selected outcome activities that each invoke a command in the learning application.

According to a third aspect of the present invention, there is provided a method of defining a learning objective for assessment in a learning application, said learning application comprising one or more measured objectives formed from a related group of learning application measurements, said method comprising the steps of:
 selecting one or more measured objectives; and defining outcome conditions for the measured objectives According to a fourth aspect of the present invention, there is provided a method of assessing a player's performance within a learning application, said learning application comprising one or more measured objectives formed from a related group of learning application measurements, said method comprising the steps of:
 defining a learning objective by selecting one or more measured objectives and defining outcome conditions for the measured objectives; and
 selecting outcome activities that each invoke a command in the learning application.

According to further aspects, the invention provides a computer readable medium having instructions encoded thereupon that, when run on a computer, provide at least one of: the system of the first aspect; the games-based learning application of the second aspect; the method of the third aspect; and the method of the fourth aspect.

The learning objective controller is preferably operable on the computer of a facilitator for creation of learning objectives for use by a different player or players.

The learning application may be executable on a plurality of players' and/or facilitators' computers, each of which is connected to a server computer or peer-to-peer network which coordinates a multiplayer learning application event.

Preferably, the learning application controller includes means for the assessment of a learning objective, wherein an outcome activity can be assessed after the completion of a measured objective.

The outcome activities may be invoked during a learning application event at the point at which an outcome condition is satisfied.

The outcome activities are preferably invoked by executable logic within the script of the learning application.

Optionally, the outcome activities include a command to change at least one item of configurable information within the learning application.

The learning application may comprise configurable information which is customisable by a facilitator.

The configurable information may include learning application variables or parameters which are enabled for variation.

Preferably, a plurality of learning objectives can be measured simultaneously during the performance of a learning application event.

One measured objective preferably can contribute to the assessment of a plurality of learning objectives.

The learning application controller may include means for assigning a learning objective to a particular player or to a particular team of players.

Once a learning objective has been achieved by a player, a player profile optionally may be updated with the results of the performance under that learning objective.

Once a learning objective has been achieved by a team, a team profile optionally may be updated with the results of the performance under that learning objective.

Preferably, the learning application controller comprises means for a facilitator to perform an assessment of a learning objective and to directly intervene during the performance of a learning application event to invoke a learning application command.

The system may optionally include a game view component for presenting a real time player screen view to a facilitator.

In one preferred embodiment, the system further comprises a game controller component that allows a facilitator to take control over a player's game.

The facilitator role can be assumed by an individual not directly participating in an application ("trainer"-role), an individual participating in an application ("peer-support"-role) or an intelligent software component providing automated, facilitator-like monitor, control and guidance functionality.

The system may further include a cues component accessible by the facilitator to provide prompts to a player during a learning application event.

BRIEF DESCRIPTION OF THE DRAWINGS

The present invention will now be described, by way of example only, with reference to the accompanying drawings, in which.

Unless stated otherwise, the figures are taken to be well-formed UML diagrams.

DETAILED DESCRIPTION OF THE PREFERRED EMBODIMENTS

In order to understand the invention, an example embodiment will now be described. It is to be understood that this detailed example is for the purposes of illustration only, and should not be construed as limiting the scope of the invention. For example, some of the components illustrated below could be omitted or have either restricted or expanded functionalities with respect to the functions described.

Figure 1:
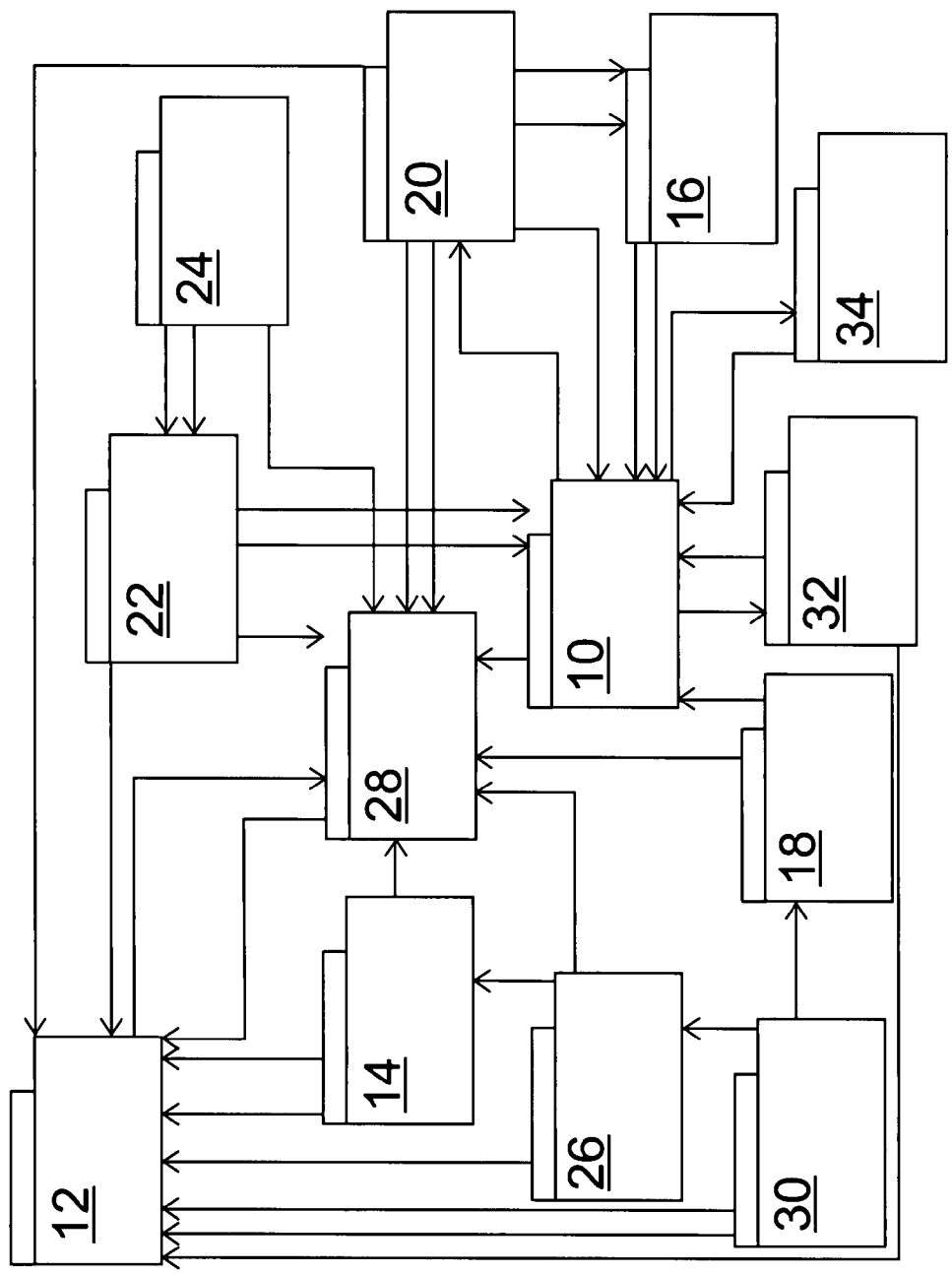
FIG. 1 shows an architecture overview.

FIG. 1 shows a general system architecture for a GBL platform. A learning application 10 is a distributable virtual environment that provides immersive educational content and is executed on the GBL platform.

The GBL server functionality 12 exists alongside an existing game engine server and extends the functionality offered by an existing game engine to enable learning applications to handle multiple players.

The GBL client core functionality 14 comprises components that exist within all users' clients that are participating within a given learning application event (LAE) and encompasses functionality that is either fundamental to the operation of a user's client or common across all the user clients.

The facilitator control component 16 allows a facilitator to initiate designer specified commands within a learning application, and allows a facilitator to present information or tutorials to any player participating within the learning application, and provides solutions to support learning objective outcomes.

The external applications component 18 allows a learning application to execute an external application, other than the learning application itself, on the players' console, and allows a facilitator to launch an external application for the purposes assessing a player participating within the learning application.

The learning objectives component 20 allows a players' performance within a learning application to be monitored and assessed by a learning manager, facilitator or the learning application. A learning manager can create and modify learning objectives within a GBL application to better fit with the needs of a particular organisation or individual. These learning objectives can then be assigned to players or teams to monitor and assess performance.

The game view component 22 allows the facilitator to view the learning application from the perspective of a player, a learning application (LA) designer defined camera or from a free-camera and allows a facilitator to provide assistance to players by drawing a freehand image which will be superimposed over their learning application's user interface in real-time.

The scribble component 24 interacts with the game view component 22 to allow a facilitator to provide assistance to players by drawing a freehand image which will be superimposed over their learning application's user interface in real-time.

The text communications component 26 allows user-to-user text communications during learning application events. (The functionality offered by the chat window feature will only be available to its users if the learning application designer makes an area of the learning application's user interface available to be used for text communications.) It also allows a facilitator or team leader to hold a meeting between all the members of a team defined within a learning application event, and a debrief feature that debrief feature encourages an individual or team to reflect on progress within the learning application event by providing the ability for a learning application to present reflection agenda item to the player in a consistent and structured manner at game selected points. The debrief feature also provides the ability for the facilitator to be able to assess an individual's performance by observing how they respond to the reflection agenda item.

The profiles component 28 allows the facilitator to create player profiles for players who are users of the GBL platform and are able to participate within learning applications events, which can be used to monitor and assess a player's performance within these events, and provides a team management feature which allows the facilitator to define groups of cooperating players within a learning application event and create a team profile that can used to monitor that team's performance within the event.

The agendas component 30 allows a facilitator or team leader to hold a meeting between all the members of a team defined within a learning application event, and a debrief feature that encourages an individual or team to reflect on progress within the learning application event by providing the ability for a learning application to present reflection agenda items to the player in a consistent and structured manner at game selected points. The debrief feature also provides the ability for the facilitator to be able to assess an individual's performance by observing how they respond to the reflection agenda item.

The customisation component 32 provides the ability for a learning manager, facilitator or SME (small-to-medium size enterprise) to customise a learning application based upon any configurable items specified by the learning application designer in order to achieve a higher level of authenticity and appropriateness for a particular organisation and tailor a particular learning event for a particular individual, set of individuals or teams.

The cues component 34 allows the learning application designer to provide help or status relating to the game elements of the learning application in a non-intrusive (to learning application flow) manner. The information to be presented will be located within the proximity of the object within the learning application.

Figure 2:
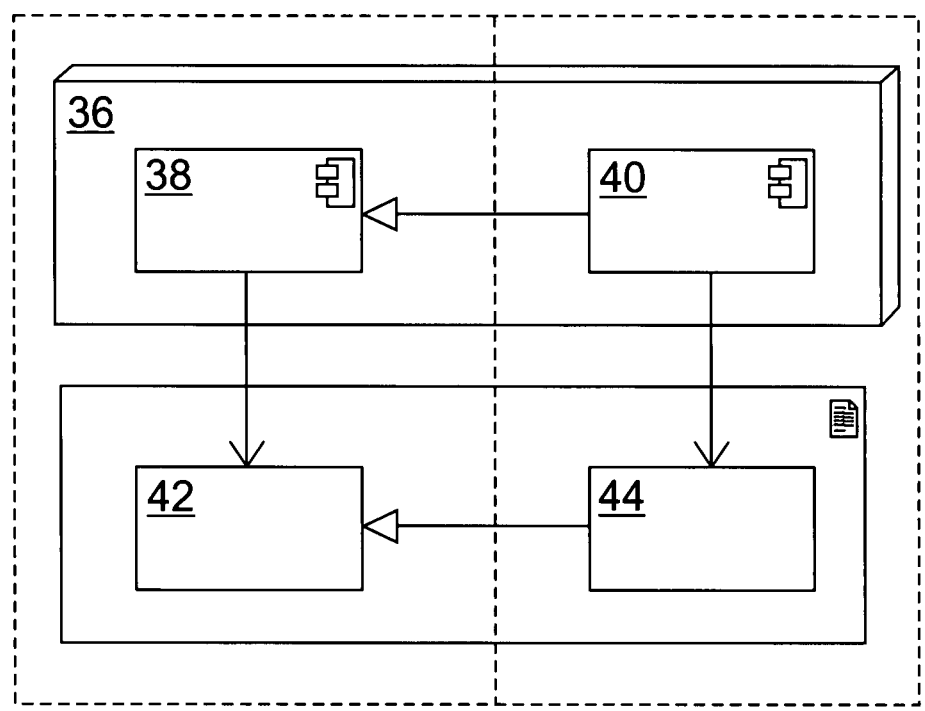
FIG. 2 shows a developer environment.
Figure 3:
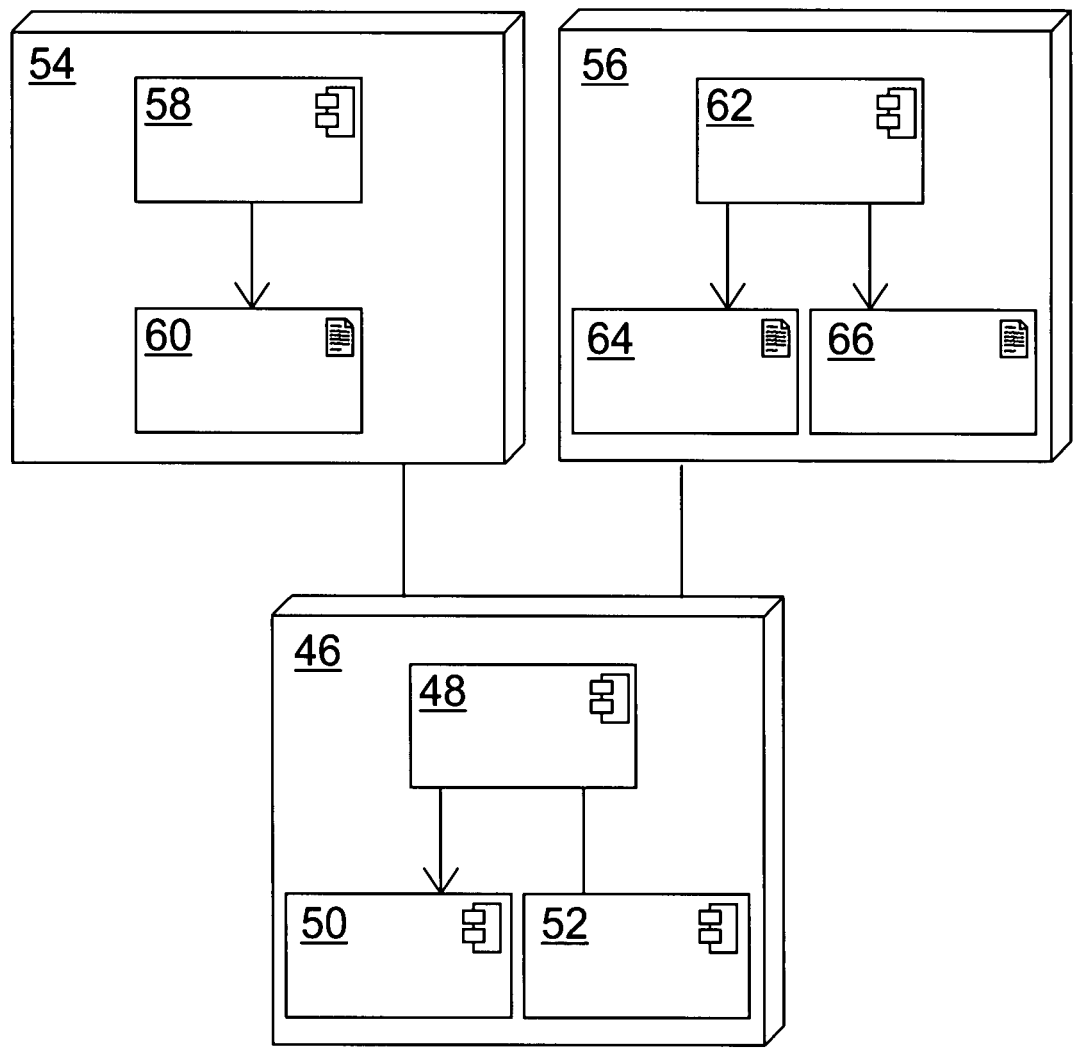
FIG. 3 shows a runtime environment.

The component deployment is flexible as the components are modular in nature. However, an example deployment is shown in FIGS. 2 and 3. In a general sense, the GBL platform supports a developer deployment environment for the production of learning applications, shown in FIG. 2 and a runtime deployment environment for the execution and monitoring of a learning application, shown in FIG. 3.

As seen in FIG. 2, in a developer environment a development computer 36 runs an existing game engine software development kit (SDK) 38 along with the GBL SDK 40, which provides an extension of the existing game engine SDK 38 relating to a set of learning extensions supported by the GBL SDK 40. The existing game engine 38 creates a game engine application 42 which can be extended by a GBL application 44 which is created by the GBL SDK 40.

FIG. 3 illustrates the runtime environment. A server computer 46 runs the game engine's server 48 which communicates with a server standalone player 50 that manages the multi-player aspects of a learning application. A connection is maintained with an ODBC compliant GBL database 52. The server computer 46 is linked (for example through IP communications links) to a player computer 54 and a facilitator computer 56. The player computer 54 is provided with a player standalone player 58 that executes a learning application 60. The facilitator computer 56 is provided with a facilitator standalone player 62 that executes a facilitator learning application 64 and facilitator application 66.

The composition and implementation of the various components shown in FIGS. 2 and 3 will be understood by the following description of the component parts of the GBL architecture as illustrated in FIG. 1.

The following sections describe in detail each of the architecture's components. Each component has one or more subcomponents that carry out various aspects of the overall component's functionality, as will be apparent forthwith.

Learning Application

Figure 4:
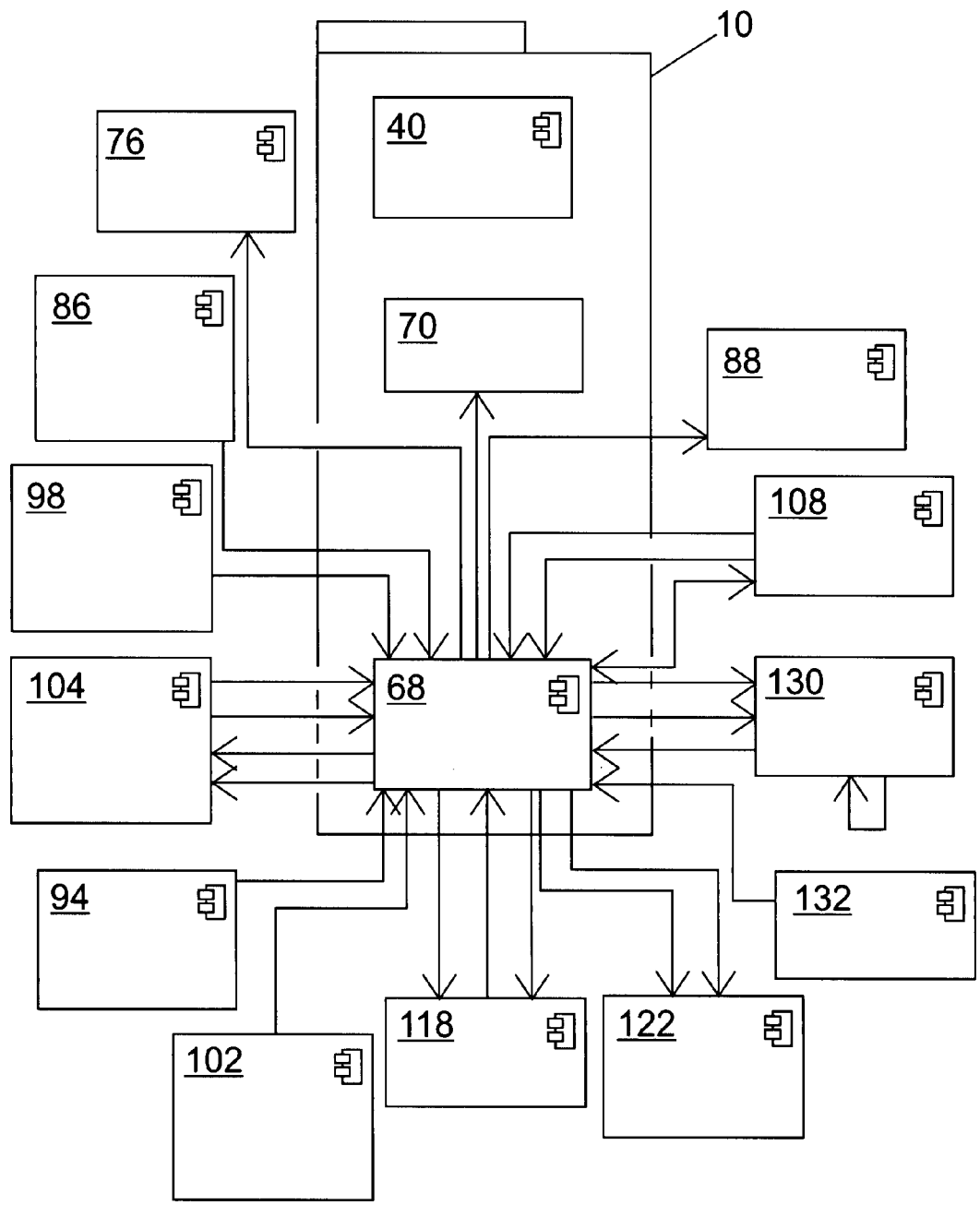
FIG. 4 shows a learning application component.

The learning application component 10 is shown in more detail in FIG. 4.

The GBL SDK 40 enables a designer to fully describe all the information and behaviour relating to the GBL extension of an existing game engine compliant application. The interfaces specified in this section are to be developed as an extension to the game engine development system to enable a designer to build a learning application.

The GBL SDK 40 comprises a designer command specification interface that provides a mechanism for the designer to register commands within the learning application that can be utilised by the facilitator during a learning application event. The designer will be able to register a command name to make available to the facilitator, and to specify the parameters and type of parameters that the command requires as inputs.

The GBL SDK 40 also comprises a pre-deployment configurable information (CI) interface which provides the designer of a learning application with a collection of GUI panes permitting the creation, modification or removal of CI within the learning application's configurable information set (CIS), and for the customisation of learning application CI to be restricted by the designer.

As part of the CI interface, there is provided a CIS interface for enabling CI descriptions to be specified and included within the learning applications CIS under the instruction of the designer; a Learning Objective (LO) interface for enabling learning objective descriptions to be specified and included within the learning application under the instruction of the designer; and a Measured Objective (MO) interface for enabling measured objective descriptions to be specified and included within the learning application under the instruction of the designer.

The GBL SDK 40 also comprises a designer external application specification interface that allows the designer to specify the name and filename for an external application, and to specify any parameters to be passed to the external application.

The GBL SDK 40 also comprises a view specification interface that provides the designer with the ability to define the learning application views that the facilitator can select to view, and to define the movement range and interactions allowed.

The GBL SDK 40 also comprises interfaces for text cues and status bar cues, as discussed later.

The main run-time operational component of the learning application 10 is the learning application (LA) runtime controller 68, which reads the learning application 70 as required on behalf of the other GBL components (as shown in FIGS. 1 and 4). The LA runtime controller 68 enables the interpretation of the LA's logical behaviour, as defined by the designer, and manages the runtime interactions with the GBL platform.

These interactions include the following relations:

The external application controller of the external application component 18 will read the description of the LA, as defined by the designer, via the LA runtime controller 68 to determine which external applications are recognised within the LA 10.

The learning application 10 uses profiles 28 to read and update information in a player or team profiles.

The learning application 10 uses customisation 32 to access and modify the configurable information of the learning application 10, and customisation 32 uses a learning application's CIS that is described by the learning application 10.

The game view 22 will use the learning application 10 to recreate a players "Heads up display" (HUD) when providing a player's perspective view of the game, and the game view 22 uses the camera views that are described by the learning application 10.

The learning application 10 uses the learning objectives component 20 to start, stop and update measured objectives, and the learning objectives 20 uses the learning application 10 to understand the measured objectives and learning objectives that have been defined by the designer.

The facilitator control 16 uses LA commands that are described by the learning application 10, and invokes LA commands specified by the designer that are available via the learning application 10.

The learning application 10 uses cues 34 to provide updated status for the cue, and the cues component 34 uses the learning application to understand the cues that have been defined by the designer.

These are the main interactions, described for brevity. The remaining interactions can be deduced from the figures and from the rest of the description. The names of the specific subcomponents of each GBL component that are used to perform the interactions mentioned above can be deduced from the figure. These subcomponents will be described elsewhere in the description.

The learning application 70 is specified and produced entirely by the designer via existing game engine development tools as extended by the GBL SDK 40. It will be distributable to all player and facilitator computers required to execute and participate with the learning application 70. The learning application 70 represents an information artifact that is responsible for maintaining the information that has been configured by the designer of the learning application 70.

GBL Server Functionality

The GBL server component 12 is illustrated with reference to FIG. 5, the key function of this component 12 is to extend the functionality of an existing game engine to enable learning applications to handle multiple players.

A GBL session master 72 manages user client requests to discover and participate with a specific learning application event (LAE). It performs various tasks including: provides a session ID for an LAE and for agendas (to be discussed elsewhere in this description); creates and deletes a common "welcome" session; instantiates an LAE session master component for each active LAE; and joins a user to the welcome session.

An LAE session master 74 exists to manage a single learning application event session and enables users to participate with it.

A storage manager 76 stores all GBL platform information in a persistent manner, allowing any component of the GBL platform to access it via open standards that are supported via the server 78 of the existing game engine.

The GBL server component 12 interacts with the remaining components of the GBL platform as follows:

The learning objectives component 20 uses GBL server functionality to install, store and retrieve learning objective definitions.

The game view component 22 uses GBL server functionality to receive an updated view of the learning application.

The GBL server functionality 12 uses the profiles component 28 to identify the participants of LAE's and agendas, and the profiles component 28 uses GBL server functionality 12 to store and retrieve profile information into persistent storage.

GBL client core functionality 14 uses GBL server functionality 12 to manage access to the sessions of the existing game engine for the LAE and "welcome" session, and uses the GBL server functionality 12 to store and retrieve information into persistent storage.

The text communications component 26 uses GBL server functionality 12 to send and receive messages between participants of a LAE.

The agendas component 30 uses GBL server functionality 12 to manage access to sessions of the existing game engine for the agenda discussion, and uses GBL server functionality 12 to store and retrieve the agenda into persistent storage.

The customisation component 32 uses GBL server functionality 12 to store the CIS into persistent storage.

GBL Client Core Functionality

The GBL client core functionality component 14 will now be described with reference to FIG. 6.

The components defined within client core functionality component 14 exist within all users' clients that are participating within a LAE and encompass functionality that is either fundamental to the operation of a user's client or common across all the user clients.

An installation coordinator interface 80 provides a user interface to handle the coordination and delegation required to install a learning application's resources into the GBL platform. It allows users to install a learning application onto the platform, and arranges for all information provided by a learning application to be installed into the platform, including learning objectives and configurable information sets.

A GBL loader 82 identifies the user before starting the execution of a user client and coordinates the loading of all the components required depending upon the user type (initialising as appropriate). It is to be noted that all user authentication is external to the platform and is assumed to have been performed prior to the user client being started.

The GBL loader 82 comprises a platform configuration interface that provides the platform installer with a collection of GUI panes permitting a logging functionality to be switched on or off as desired, and permitting the modification of the location of the database where the player profiles, team profiles, learning objectives, learning application events and output logs are stored.

A learning application event (LAE) interface 84 provides a user interface for the management of learning application events which will be available to learning managers and facilitators. It comprises a learning application event management interface, which provides a collection of GUI panes permitting a facilitator or learning manager to view an existing learning application event, create a new learning application event, and to start, complete or suspend a learning application event.

A learning application event controller 86 manages learning application events by associating related resources to create a single entity representing an active learning application, ready to accept participating users within a learning environment. It provides a learning application event interface will provide the learning application script with the ability to create a new LA event, start a new LA event or resume an existing LA event that was previously saved; suspend an LA event to be resumed at a later time or abandon an LA event; complete an existing LA event; add players to or remove players from an existing LA event; and add teams to or remove teams from an existing LAE event.

A log controller 88 handles requests from any component of the GBL platform to record information into a log that is associated with a learning application event. It comprises a logging interface provide the learning application script logic with the ability to request the storage of data within the log and to assign a category to data being stored to enable filtering in external tools. During logging of data the platform will assign a timestamp to the data being stored.

A facilitator client interface enables navigation through the set of user interfaces available to a facilitator. This interface will only be present in a facilitator client application. The available user interfaces may include an LA Event Interface, Profile Interface, Command Interface, Configuration Interface, View Interface, 2D Overlay Interface, Chat Interface, Agenda Management Interface, Learning Objective Interface, External Application Interface.

The GBL client core functionality component 14 interacts with the GBL server functionality 12 as described above, and also to the remaining components of the GBL platform as follows:

The GBL client core functionality 14 uses the profiles component 28 to select participants of a LAE.

The text communications component 26 uses GBL client core functionality 14 to record all text communications within the LAE's log.

Facilitator Control

The facilitator control component 16 will now be described with reference to FIG. 7. The facilitator control of a learning application allows a facilitator to initiate designer specified commands within a learning application. The facilitator selects a command from a list of available commands, and enters parameter values for each available parameter of the command before instructing the learning application script to perform the command.

The facilitator control component 16 also provides a briefing feature that allows a facilitator to present information or tutorials to any player participating within the learning application. All briefings are specified by the learning application designer within the learning application, which can be video, audio, text or even fully interactive level of a learning application. The platform provides a list of all players within a participating within the learning application, and the facilitator selects the players to receive the briefing (command). The player is then presented with and interacts with the briefing. In addition, the learning application script can generate a textual alert to provide the facilitators of the learning application event with the briefing status.

The facilitator control component 16 also supports learning objective outcomes.

The facilitator control component 16 comprises a command interface 92 enabling commands defined by the designer to be invoked by facilitators during a learning application event. It comprises a Facilitator Command Selection Interface that provides the facilitator of a learning application event with a collection of GUI panes permitting him to request a list of commands provided by the learning application, and select and invoke a learning application command from the list.

The command interface 92 also comprises a Parameter Entry Interface that provides the facilitator of a learning application event with a collection of GUI panes permitting the selection of a player from a list of players participating in the LA event or a team from a list of teams participating in the LA event, and that provides numeric or textual information as input, browses for and indicate a filename as input, and selects from a list of LA designer provided information.

The facilitator control component 16 further comprises a command controller 94 that manages the commands that are defined within a learning application and handles requests from other GBL components to invoke them.

The command controller 94 will read the description of the LA, as defined by the designer, via the LA runtime controller 68 to determine which commands are available, and invoke LA commands via the LA runtime controller 68.

The facilitator client interface 90 of the GBL client core functionality 16 transfers input/output focus to the command interface 92, and vice-versa, as appropriate.

Furthermore, the facilitator is also provided via the command controller 64 with an game control component that allows the facilitator to take over control of the player's game, so that the facilitator can demonstrate to the player how a particular task should be performed. This "dual control" aspect allows direct coaching in a novel way.

External Applications

The external applications component 18 will now be described with reference to FIG. 8. The component 18 allows a learning application to execute an external application, other than the learning application itself, on the players' console; and allows a facilitator to launch an external application for the purposes assessing a player participating within the learning application.

The external applications component 18 comprises an external application interface 96 enabling external applications described and recognised by the designer to be invoked by facilitators during a learning application event. It also provides a user interface giving the opportunity for a user to accept or reject a request to invoke an external application within the users client.

The external application interface 96 comprises a Facilitator External Application Initiation Interface that provides the facilitator of a learning application event with a collection of GUI panes permitting the selection of a single external application to be initiated from a list of all the possible external applications available within a learning application, and the selection one or more players, or a team within an event to receive an application; and to initiate the selected application for the selected players or teams.

The external application interface 96 also comprises a Facilitator External Application Configuration Interface that provides the facilitator of a learning application event with a collection of GUI panes permitting the selection of an external application from a list of learning application information, the modification of which external application is to be launched, and the modification of the parameters associated with an external application.

The external application interface 96 further comprises a Player External Application Invitation Interface that provides the player of a learning application event with a collection of GUI panes permitting him to view the name of the external application and accept of reject the invitation to launch an external application.

The component 18 also comprises an external application controller 98 that manages the external applications that are recognised within a learning application and handles requests from other GBL components to invoke them.

The external application controller 98 comprises an External Application Access Interface that provides the learning application script logic with the ability to launch an external application with a set of parameters, to receive notification that an external application has completed its execution and closed, and to receive notification that an external application gains or loses focus.

The external application controller 98 also comprises an External Application Invitation Interface that provides the learning application script logic with the ability to receive notification when an external application launch has been initiated by a facilitator for a player, and accept or reject the launch of an external application.

Figure 8:
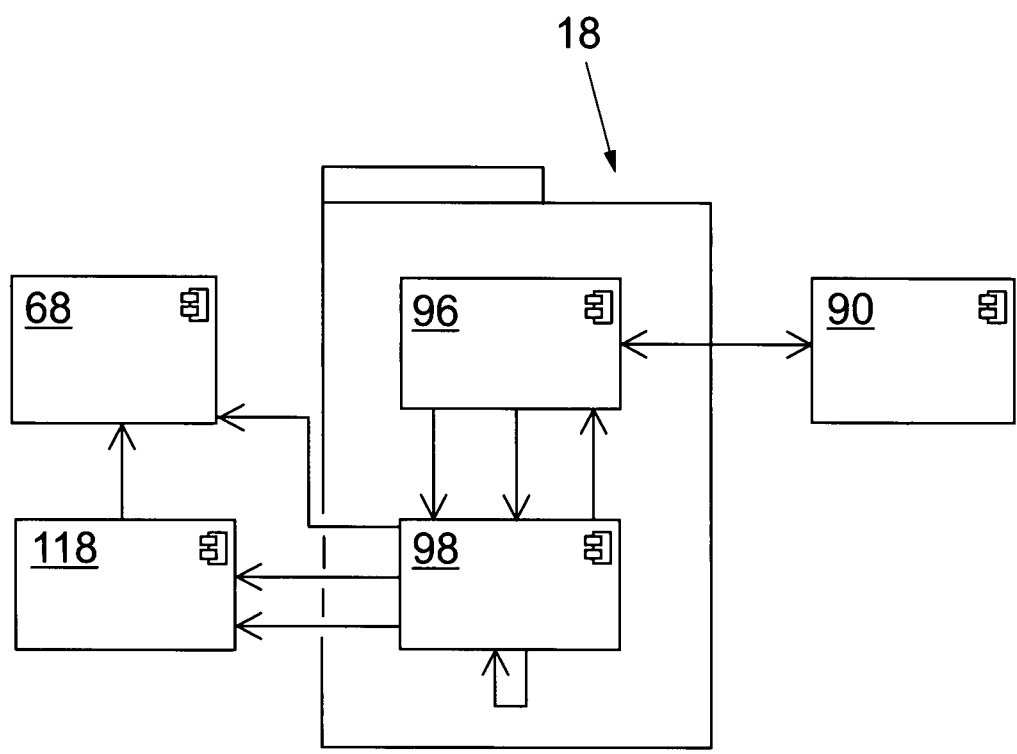
FIG. 8 shows an external applications component.

As seen from FIG. 8 and FIG. 1, the external application controller 98 will read the description of the LA, as defined by the designer, via the LA runtime controller 68 to determine which external applications are recognised within the LA.

The external application controller 98 will instruct the profile controller of the profiles component 28 to pause or continue a users client in preparation for an external application being executed, and can query the status of a user client (paused or running) from the profile controller.

The facilitator client interface 90 from the GBL client core functionality 14 transfers input/output focus to the external application interface 96, and vice-versa, as appropriate.

The agendas component 30 utilises the external application functionality 18 to execute the agenda discussion application, enabling a participant of a LA to exist within multiple sessions of an existing game engine.

Learning Objectives

The learning objectives component 20 will now be described with reference to FIG. 9. Learning objectives can be managed to allow a players' performance within a learning application to be monitored and assessed by a learning manager, facilitator or the learning application.

It is useful at this point to review the definitions and capabilities of the various people that interact with the GBL platform. A designer is a software developer that uses the developer environment shown in FIG. 2 to create a computer game which can take any from that he chooses. For example, it could be a jungle survival game or a world war 2 based first person role-playing game (RPG). No matter the type and theme of the game, it can be used for the measurement and assessment of any learning objective, as described below. The term "game" will generally be synonymous with the term "learning application" unless specifically stated otherwise.

A facilitator assists players to learn. The facilitator is responsible for establishing and overseeing a learning application event, and for performing event configuration, runtime customisation, communication and analysis for assessment. The facilitator can also define learning objectives, as discussed below, and is involved in agendas and team meetings, as discussed elsewhere. The facilitator generally does not need any technical expertise but does possess expertise in facilitation and analysis for assessment purposes. In one form of the invention, a player can also have full facilitator control so that he can set his own learning objectives, that is, the facilitator and the player can be the same person in an embodiment where the learning application is used for self-assessment.

A learning manager is a facilitator that has more permissions within the GBL platform, specifically for managing the game's configurable information and for defining learning objectives. The relative permissions granted to the learning manager and the facilitator can be modified, and as such the learning manager aspect is an optional extra of the GBL platform. It may be used for example for a large company, where the learning manager has the overall responsibility for learning, so they define the learning objectives that are to be assessed, leaving it to the facilitators to oversee the actual learning application events and to carry out the assessments. Or, for a smaller company, the distinction between learning manager and facilitator can be dispensed with and the facilitator can have full control permissions for setting configurable information (within the limits previously specified by the game designer), defining learning objectives and monitoring and recording the players' performance during a learning application event.

Finally, the players are the users who use learning application to be taught various skills or topics. The players can be organised into teams and a particular player can be designated as a team leader for the purposes of organising team debriefings and agenda discussions.

The learning objectives component 20 is a key part of a new method of in-game assessment, providing a suite of design tools and assessment tools that allow a learning manager to define their own assessments according to their needs and the needs of the participants for any given game, rather than in previous games for learning in which the learning objectives are restricted by the game itself.

A learning objective controller 102 is provided that manages all learning objectives that are defined for a learning application event and handles requests from other GBL components that relate to them. These activities include some or all of the following:

Installing designer defined learning objectives into the GBL platform via an installation coordinator interface of the GBL client core functionality component 14.

Assigning learning objectives to either players or teams by updating a profile controller of the profile component 28.

Evaluating completion conditions for any assigned learning objective (with reference to the measured objective controller 104 which communicates with the LA runtime controller 68.

Evaluating learning objective outcome activities for completed learning objectives.

Instructing appropriate learning objective outcome activities to be invoked for a player.

Store and retrieving learning objectives and learning objectives assignments via the "storage manager" component 76.

Provide a list of learning objectives and their details on request.

Updating the appropriate profile/s when via "profile controller" component when a LA session ends.

Saving and restore the LO controller state on request.

The learning objective interface 100 also provides a Learning Objective Assignment programming interface for assigning or un-assigning a player or team with a learning objective that has been defined by the learning application designer.

The measured objective controller 104 referred to above manages all measured objectives that are defined within a learning application and handles requests from other GBL components relating to them. Its interactions with the learning objective controller 102, the LA runtime controller 68 and the learning application event controller 86 are shown in FIG. 9. The measured objective controller 104 is responsible for some or all of the following:

Understanding the measured objectives that are defined within the learning application.

Receiving updated measurement values from the learning application for all measured objectives.

Maintaining a list of current measurements for all measured objectives.

Collating multiple measurement values and calculating a single measurement value for measured objectives involved with team based learning objectives.

Receiving notifications to start or stop measured objectives from the learning application.

Maintaining a list of current measurement status (started or stopped) for all measured objectives.

Providing the current measurement values for all measured objectives.

Providing the current measurement status for all measured objectives.

Providing a timer for timed measurements.

During the design of a game, the designer specifies a number of learning application (LA) measurements, which are combined to form a measured objective. The LA measurements can comprise any variable or parameter within the game as defined by the designer, which can include an incrementable counter, a value, a floating point, a string, a Boolean operator or a timer.

In general, a game may comprise a number of objects, attributes, internal relationships and an environment, with interactions being governed by a set of rules. For example, a game typically comprises an environment defining boundaries for game activities, one or more user-controlled agents, computer controlled agents and computer controlled environmental parameters. The LA measurements can comprise any variable within this and any other scheme, including any of the environmental parameters and any characteristic which is allocated to the user-controlled agent, or to the computer controlled character.

As a further specific example, a game environment could comprise a jungle area which comprises a river portion and the user controlled agent could comprise a human explorer, so that the river portion defines a portion of the environment that the explorer cannot walk on. An environmental parameter could comprise a population density of piranha fish in the river, and the computer controlled character could comprise one or more killer monkeys. The LA measurements could then comprise the strength and speed of the explorer, the strength and speed of the killer monkeys, the population density of the piranha fish, the speed of water flow in the river, and so on.

Each LA measurement is defined by a name, a unique identifier, a description and a measurement type, as mentioned above. It is typical that three types are available—counter, value and duration.

The game designer then specifies a number of measured objectives, giving each of them a name, a unique identifier, a description, and a list of LA measurements used to form the measured objective. Each measured objective has a clearly defined start and end point. For example, the measured objective could be the time taken to complete various tasks, or the count of a particular parameter once a task has been completed.

The game designer also specifies a number of outcome activities which are to be supported by the learning application. The outcome activities are references to executable logic within the learning application script. An outcome activity will be invoked when an outcome condition is satisfied. This can be done automatically during the performance of a learning application event. Each outcome activity definition includes a unique name and a value (expressed in terms of the LA measurements) for the outcome activity, and a description of the logical behaviour to be performed by the outcome activity.

The learning manager can then create a learning objective (LO) by selecting one or more measured objectives and one or more outcome activities which are made available by the designer, and by defining outcome conditions which specify objective thresholds to be applied to the associated outcome activities.

The learning manager then requests and obtains a list of all LA commands defined within the LA script, and associates an outcome activity to each outcome condition defined. The outcome activities can for example be one of the following: A learning application command; Write to a players profile; Create a reflection or debrief agenda item.

The learning manager interacts with the facilitator client interface 90 through which a learning objective interface 100 presents a learning objective management interface for the creation and management of learning objectives. The learning objective controller obtains the measured objectives and LA measurements from the measured objective controller 104 which reads the measured objectives from the learning application runtime controller 68.

The learning objective is defined as a combination of the measured objectives and chosen outcome activities, the invocation of which is described by one or more outcome conditions that specify, via a mathematical formula defined by the learning manager, a predetermined criteria expressed in terms of measured objectives which determines when the outcome activities should be invoked.

The facilitator or learning manager makes a qualitative decision as to the definition of a learning objective based on particular thresholds and combinations of one or more measured objective. For example, in the above jungle game, a player may be part of a team (of computer generated or other player controlled characters), and a facilitator may want to assess as a learning objective how effective a player's team leadership skills. The facilitator therefore can construct a learning objective to measure team leadership by selecting the measured objectives of the number of survivors crossing a river, the final strength of players that survive, and the time taken to complete a river crossing are evaluated, and then, for example, the team leadership could be assessed as a weighted combination of the measured objectives, with a particular objective deemed to be more important than another objective being given a higher weight in the calculation. The learning objective can be defined either before a learning application event begins or during the performance of a learning application event.

In a further example process, a players' LA actions are measured against a learning objective. When the player performs a LA action, the LA script determines and performs an appropriate response. The possible responses being for example: Do nothing; Start or stop a timer; Increment or decrement a counter; Store a value; or Complete a measured objective.

When measured objectives are started, measurements are made by the platform only if a learning objective contains the measured objective and that learning objective is assigned to a player. Assignment of a learning objective to a player indicates that the platform should no longer ignore measurements for a started measured objective.

The platform then determines whether any learning objectives have ended. For all completed learning objectives, the platform evaluates the outcome conditions to determine which outcome activity to perform, instructing the LA script as appropriate. For all outcome conditions met, the platform records the outcome condition in either the player or team profile, as appropriate.

That is, in the above example, after the river crossing is complete, the learning objective is assessed and the appropriate outcome conditions are evaluated. Depending on the outcome conditions, a different outcome is selected which results in a particular command being carried out. For example, based on the combination of the measured objectives, the facilitator can calculate an overall score for a player's team leadership skills. If this score is over a predetermined threshold, the player can be passed to the next level of the game, or to have the difficulty increased by varying the game's configurable information (for example, increasing an LA measurement such as the number of piranhas in the river), or if below, he can be asked to repeat the task.

It will be appreciated that the same jungle game could then be used to assess different learning objectives, for example, jungle survival skills, aggressiveness, decision making, and so on. The interfaces and components of the learning objectives component 20 and the GBL platform in general provide the tools and the environment for one or more facilitators to define a predetermined assessment method of any chosen learning objective within the context of any one game (learning application).

The outcome conditions are preferably evaluated by the platform in the order specified when a measurement is made and when a measured objective has been stopped. Consequently, learning objectives that are specified by a learning manager are started and stopped implicitly when the measured objectives used are started and stopped. The actions, timings and cues for the starting and stopping of measured objectives are typically specified by the LA designer within the LA script, which determines whether a learning objective is assessed at the behest of the facilitator, or automatically, or a selectable combination of both. It may be possible for a measured objective to be attempted more than once, in which case the platform will store the previous values of the measured objective measurements and reset to initial values.

Once defined, all learning objectives can be assigned or unassigned to either players or teams throughout a learning application event. Whenever a learning objective is assigned or unassigned to a player, a historical record of the assignation and ultimately the learning objective results within that LA event can be stored within the player's profile. When a learning objective is assigned to a team, this historical record can be stored within the team's profile, and measurements made by the learning application contained within the learning objective becomes valid.

It is of course possible that during a learning application event the measurement of one measured objective may contribute to more than one learning objective and that a single learning application event can give data for the assessment of more than one learning objective. The outcome activities are performed on the basis of a command actioned by the achievement of the threshold of the measured objective. When a measured objective has been stopped the outcome conditions are evaluated in specified order.

It is to be appreciated that the learning objectives can be assessed as part of a single player or a multi-player game, without restriction. The objectives can be assigned to one particular player or to a team in general, for a fully flexible assessment environment.

Another exciting feature provided by this solution is the run-time interaction of the assessment. The assessment can be carried out while a learning application event is running and the facilitator can determine the feedback appropriate to the achievement and the situation, and then issue a game command that will change the game as needed, either by an automatically invoked command set out in the LA script or by direct intervention.

Figure 1A:
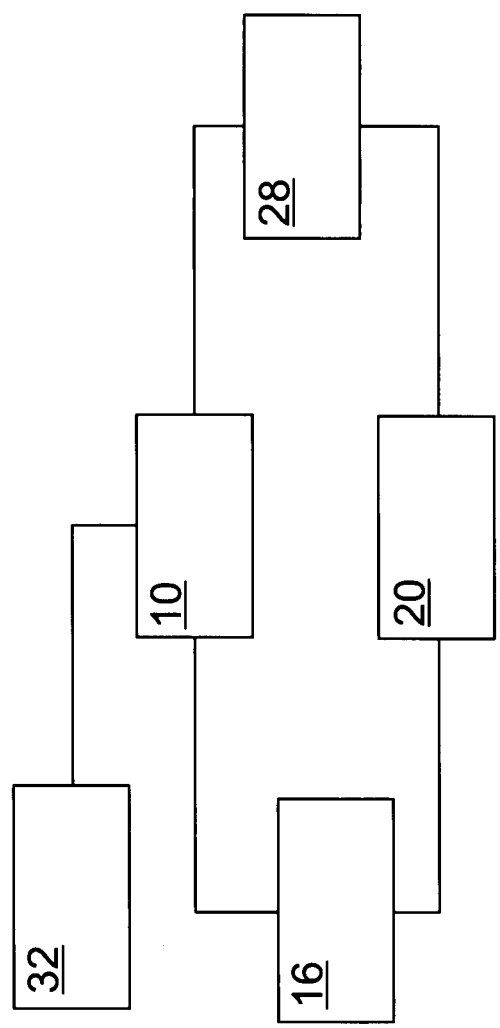
FIG. 1A shows some preferred components that enable a flexible in-game assessment.

As mentioned elsewhere in the present application, the described embodiment of a GBL platform is for the purposes of illustration only and is not intended to be limiting. An illustration of the essential and some preferred components that enable a flexible in-game assessment is shown in FIG. 1a. The components illustrated therein are understood to be similar to those shown in FIG. 1 and so have been illustrated with the same reference numerals for convenience. However, it is to be understood that for a more limited system that has the sole purpose of providing a flexible in-game assessment with no extra features, the functionality of each component is taken to be either absent or disabled insofar as those extra features go. Furthermore, for clarity of illustration, the GBL server 12 and the GBL client 14 have been omitted from FIG. 1a, although they are understood to be present, and connected as described elsewhere.

The key interactions are between the learning application 10, learning objectives 20 and the facilitator control 16. It is to be appreciated that the facilitator control can be provided at a separate facilitator location, for example on a desktop PC that is used exclusively by a facilitator, or the facilitator control can be provided to the player to be run on the same computer as they use to run the learning application, so that they can self-assess their performance.

In addition to the key interactions, the profiles 28 and customisation 32 features can also be used to further enhance the flexibility and portability of the in-game assessment. The functionality and connectability of these components is described elsewhere and so will not be described in detail again, suffice it to say again that the functionality of each of these components is taken to be either absent or disabled insofar as they relate to extra components not described in FIG. 1a.

Of course, the in-game assessment can be provided with any other combination of features that are shown in FIG. 1, that is various different numbers of components connected in different ways. A person skilled in the art will be able to "pick and choose" the functionality that is required for a particular implementation.

Game View

The game view component 22 will now be described with reference to FIG. 10. The game view feature allows the facilitator to view the learning application from the perspective of a player, a LA designer defined camera or from a free-camera.

The component 22 comprises a view interface 106 allowing a facilitator to see the learning application from any of the camera views available from the learning application, and a view controller 108 that manages the available camera views defined by a learning application and the handling of 2D overlays to support both the "scribble" feature (described below) and generation of a player view that includes a HUD.

The view interface 106 comprises a facilitator view selection interface that provides the facilitator of a Learning Application with a collection of GUI panes permitting him to choose to view the learning application from one of the designer defined cameras, from the perspective of any of the participating players, or from a free-camera view, and to start and stop presentation of the selected view of the learning application. The view will be updated in sync with the events occurring in the learning application.

The view controller 108 provides a list of cameras available for the learning application, and acts to start and stop views of the learning application. It provides (and removes) a position from which a facilitator can view a learning application, and enables a 2D overlay to be encoded and decoded, started, stopped and cleared, and also enables the 2D overlays to be sent to and from other participants, and HUD information to be sent to and from a facilitator.

Scribble

The scribble feature will be described with reference to FIG. 11. The scribble feature allows a facilitator to provide assistance to players by drawing a freehand image which will be superimposed over their learning application's user interface in real-time.

The 2D overlay interface 110 offers functionality to a facilitator. It presents tools allowing a 2D overlay to be drawn, presents the 2D overlay as it is being drawn and then clears the 2D overlay. From a player's perspective, this component is responsible for presenting and clearing the 2D overlay.

In a preferred embodiment, it will not be possible for the player to interact with the 2D overlay's display, which will be displayed at the facilitators' discretion and cleared when the 2D overlay ends.

Text Communications

The text communications component 26 will be described with reference to FIG. 12. Players and facilitators, during the course of a learning application event, may choose to communicate with one another through a text communications service. A player may communicate with one or more players, with one or more facilitators, with the members in their team or the members of another team or with everyone. All communication between users of the platform can be recorded in persistent storage.

In addition to having the same communications options as the players, all other communications from participants of the learning application will appear in the facilitator's message window. From this message window, the facilitator will be able to create, apply and clear filters so that only communications from or to a certain player or group of players is shown.

In order to allow for the facilitator to be alerted to events occurring within the learning application that are deemed significant, the facilitators message window will also operate as a receiver for learning application originated alerts which cannot be filtered out.

The component 26 enables a chat window feature that allows user-to-user text communications during learning application events. The functionality offered by the chat window feature will only be available to its users if the learning application designer makes an area of the learning application's user interface available to be used for text communications.

The component 26 also enables a team meeting feature which allows a facilitator or team leader to hold a meeting between all the members of a team defined within a learning application event.

The component 26 further enables a debrief feature encourages an individual or team to reflect on progress within the learning application event by providing the ability for a learning application to present reflection agenda item to the player in a consistent and structured manner at game selected points. It also provides the ability for the facilitator to be able to assess an individual's performance by observing how they respond to the reflection agenda item.

The component 26 comprises a chat interface 112 that allows learning application participants to communicate via text-based messages, and a chat controller 114 that handles the sending and receiving of text communications between two users participating in a learning application.

The chat interface 112 comprises a text communication interface that allows all participants of a learning application event to send text communications to other participants; a facilitators' view text communications interface that allows a facilitator to view all the communications occurring between the participants of the LA event whilst also creating and applying filters to them; a players' view text communications interface that allows players to view any text communications occurring that is addressed to them; and an alert display interface that allows the facilitator to receive text alerts from the platform or learning application.

The chat controller 114 comprises a text alert interface. This will allow the learning application script to send a text alert to all facilitators. The chat controller 114 also provides functionality to send messages to one or more participants of a learning application, record messages and alerts via a log controller, provide a history of text chat from/to the user client and a history of system alerts from/to the user client, and to save and restore the chat controller state on request.

Profiles

The profile component 28 will now be described with reference to FIG. 13.

A separate player profile will be used to identify each player capable of participating in a learning application event. The player profile will also archive the pertinent facts about the players learning activities and achievements over an extended period of time, such as an academic term.

The player profile information, in conjunction with the team profiles, will be used by a facilitator to analyse and adapt the learning needs of a player; therefore, the facilitator will need full access to the information it contains.

Equally, the learning application script logic and the learning objective outcome activities need to be able to record facts relating to players learning progress. Therefore, they also need full access to the information it contains.

It is not necessary for a player themselves to be able to access the player profile information.

A separate team profile will be used to identify each team of players existing within a single learning application event. The team profile will also archive the pertinent facts about the teams learning activities and achievements within a single learning application event.

The team profile information, in conjunction with the player profile, will be used by a facilitator to analyse and adapt the learning needs of a player in that team; therefore, the facilitator will need full access to the information it contains. Again, it is not necessary for a player themselves to be able to access the team profile information.

The component 28 comprises a profile interface 116 that allows the profiles associated with players and teams within a learning application event to be viewed and modified, and a profile controller 118 that manages all aspects relating to the players and teams that are defined within GBL platform.

The profile interface 116 comprises a player profile management interface that enables a facilitator to add, view, change or delete all persistent information relating to any players' profile; a team profile management interface that presents the facilitator with the ability to view, create, edit and delete teams and manage the assignment of team members by adding and removing players; and a team leader selection interface that presents the facilitator with the ability to appoint or release a team leader to/from a team.

The profile controller 118 comprises a Player Query Interface that gets a list of players present within the current learning application event; a Team Query Interface that gets a list of teams present within the current learning application event, gets a list of players in each team, and queries which player is assigned as the team leader for a team within a learning application event; a Player Profile Access Interface that can retrieve and modify any information relating to a players' identity, retrieve and add to information relating to players' learning application event activities, and modify any information relating to players' learning application event activities; a Player Profile Creation Interface that creates a player profile identity with player identity attributes for an identified player; a Team Profile Access Interface that will enable a learning application script and a learning objective outcome activity to read or change all persistent information relating to the teams' profile; a Team profile creation interface that enables a learning application script to create a team profile; a Suspend Player Interface that suspends the extraneous processing of a player's learning application such as the rendering, temporarily removes the player from the learning application session, and requests suspension of any learning objectives assigned to the player; and a Resume Player Interface that resumes the player's presence within the learning application session using the previously saved player suspension information, restores the extraneous processing of a player's learning application such as the rendering, and resumes any suspended learning objectives.

Agendas

Figure 14:
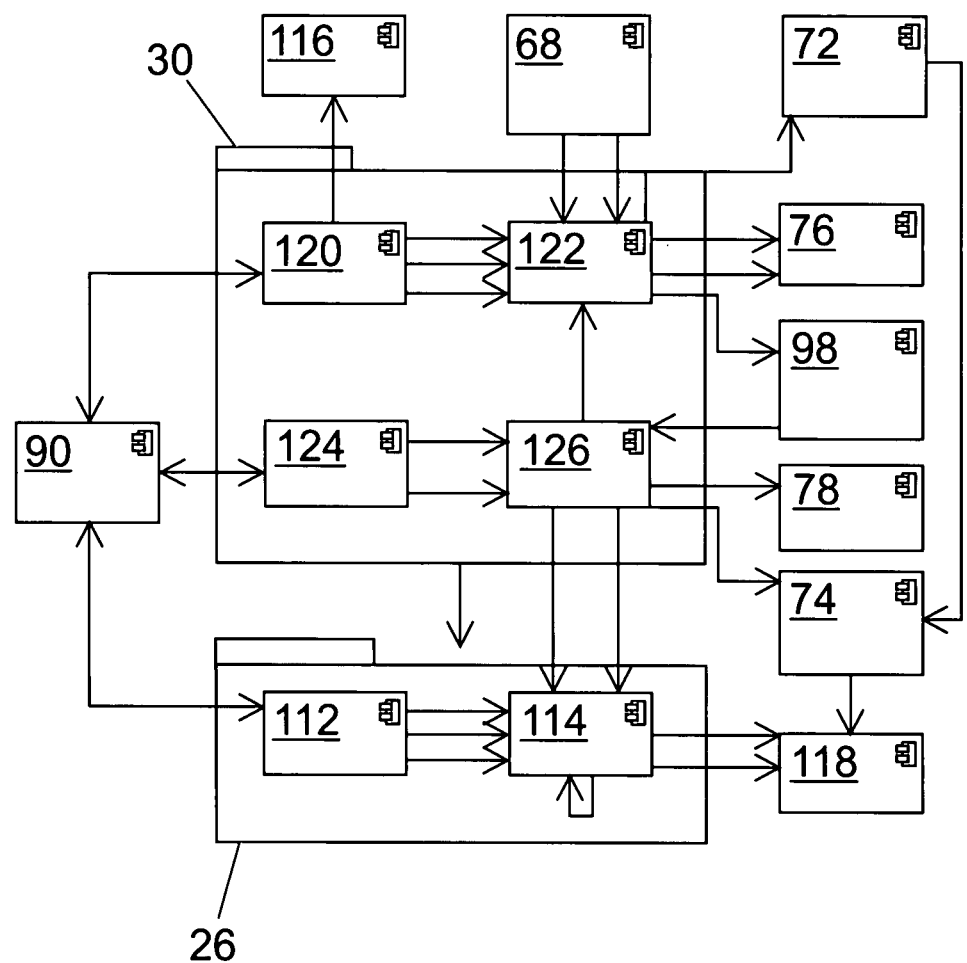
FIG. 14 shows an agendas component.

The agenda component 30 provides a user interface allowing agendas associated with reflections, debriefs and team meetings, in conjunction with the text communications component 26 as shown in FIG. 14.

An agenda management interface 120 is responsible for This component is responsible for enabling users to create, delete or modify agendas, select an agenda, add new agenda items, specify users to be involved in an agenda, and for allowing users to initiate an agenda discussion and displaying an agenda to the user.

An agenda management controller 122 manages all aspects of agendas within the GBL platform prior to an agenda being discussed. It is responsible for creating, deleting and modifying agendas, adding agenda items to an agenda, initiating an agenda discussion and inviting the participants, and retrieving an agenda and providing access to it.

An agenda discussion interface 124 is provided, allowing specific agendas to be discussed among one or more participants of an LAE. It is responsible for presenting an agenda to each participant, enabling a participant to take or relinquish control, and then enabling the participant with control of a discussion to advance to the next agenda item or to end the agenda discussion. Facilitators take priority over team leaders, who in turn take priority over players with respect to agenda control.

An agenda discussion controller 126 is manages the discussion of individual agendas between one or more participants. It is responsible for allowing a single participant to take or relinquish control of the agenda discussion, allowing the user in control to advance the discussion to the next agenda item or to conclude the agenda discussion, negotiating with the LAE session master to join the appropriate session for the agenda discussion, and negotiating with the server of the existing game engine when leaving the existing game engine session for the agenda discussion.

Customisation

The customisation component 32 will be described with reference to FIG. 15. The customisation feature provides the ability for a learning manager, facilitator or SME to customise a learning application based upon any configurable items specified by the learning application designer in order to achieve a higher level of authenticity and appropriateness for a particular organisation and tailor a particular learning event for a particular individual, set of individuals or teams.

A configuration interface 128 is provided allowing configurable information sets (CIS's) to be created and managed.

Any information that can be modified, for which the learning application is responsible, is referred to as configurable information (CI). CI is collated together to form a configurable information set (CIS), from which it is possible to establish one or more learning application events. A learning application event will only ever use CI from a single CIS.

For traceability, it can be possible to retrieve the exact CIS used to establish any current or historical learning application events. As such, when a change is applied to any CI that is part of a CIS used to establish a learning application event, the original CIS will remain unchanged and instead, a new CIS is created reflecting any changes.

The learning application designer is responsible for specifying when CI can be modified by users of the learning application throughout its lifetime; these are:
- Pre-deployment configurable information. (modifiable by learning application designers)
- Post-deployment configurable information. (modifiable by learning manager & facilitators)
- Runtime configurable information. (modifiable by facilitators)

It may also be possible for the learning application's script logic to access (store and retrieve) the CI values contained within the CIS that is associated with the specific learning application event.

The configuration interface 128 provides functionality to a facilitator, being responsible for presenting all the defined CIS, enabling the creation of a new CIS from existing CIS in persistent storage, enabling modifications to a configurable item in an existing CIS and enabling the deletion of CIS that are not already associated with LAE that have started.

The configuration controller 130 manages all the configurable information sets defined within the GBL platform, both prior to and during runtime. It is responsible for installing a learning applications default CIS into persistent storage via the storage manager, creating deleting and modifying existing CIS, retrieving and providing access to the defined CIS, receiving and handling notifications of changes to configurable items at runtime, synchronising changes to a CI amongst all participating clients at runtime, and saving and restoring the configuration controller state on request.

Cues

The cues component 34 will now be described with reference to FIG. 16.

During a learning application event it is possible for a user to receive information (for example help or status advice) associated with objects in the game world. Information is either in the form of text or a status bar that is displayed in 2D screen space at a position related to the position of the 3D object to which the cue is associated.

In order to support cue functionality, the cue controller 132 provides a Text Cue Interface which permits a designer to specify text based cues in the learning application script which will be displayed to users of the learning application, and a Status Bar Cue Interface which permits a designer to specify status bar based cues in the learning application script which will be displayed to users of the learning applications.

Various modifications and improvements can be made to the above without departing from the scope of the invention.

Tables of Text Describing Process Flows in Figures

The numbers shown in the following tables refer to the elements (by their reference number) of the process flow shown in the drawings. The associated text describes the process flow between the elements.

TABLE 1

Description of Process Flows in FIGS. 1 and 1a

| | |
|---|---|
| 10 to 28: | access |
| 10 to 34: | update |
| 10 to 20: | update MO |
| 10 to 32: | access |
| 12 to 28: | identify user |
| 14 to 12: | session mgt |
| 14 to 12: | store/retrieve |
| 14 to 28: | participants |
| 16 to 10: | invoke |
| 16 to 10: | describe |
| 18 to 28: | pause/continue |
| 18 to 10: | describe |
| 20 to 16: | discover |
| 20 to 16: | invoke |
| 20 to 12: | store/retrieve |
| 20 to 28: | identify user/team |
| 20 to 28: | update |
| 20 to 10: | describe |
| 22 to 10: | recreate HUD |
| 22 to 10: | describe |
| 22 to 28: | query |
| 22 to 12: | update |
| 24 to 28: | recipients |
| 24 to 22: | encode/decode |
| 24 to 22: | send/receive |
| 26 to 12: | store/retrieve |
| 26 to 14: | record |
| 26 to 28: | participants |
| 28 to 12: | store/retrieve |
| 30 to 12: | store/retrieve |
| 30 to 12: | session Mgt |
| 30 to 18: | execute |
| 30 to 26: | communicate |
| 32 to 10: | describe |
| 32 to 12: | store/retrieve |
| 34 to 10: | describe |

TABLE 2

Description of Process Flows in FIG. 2

| | |
|---|---|
| 38 to 42: | create |
| 40 to 38: | extends |
| 40 to 44: | create |
| 44 to 42: | extends |

TABLE 3

Description of Process Flows in FIGS. 3

| | |
|---|---|
| 58 to 60: | execute |
| 62 to 64: | execute |
| 62 to 66: | execute |

TABLE 4

Description of Process Flows in FIG. 4

| | |
|---|---|
| 68 to 76: | store/retrieve state |
| 68 to 70: | read LA |
| 68 to 88: | record |
| 68 to 118: | modify |
| 68 to 118: | read profile |
| 68 to 122: | initiate |
| 68 to 122: | insert |
| 68 to 130: | read |
| 68 to 130: | modify |
| 68 to 104: | start/stop |
| 68 to 104: | measure |
| 68 to 108: | get HUD |
| 86 to 68: | ready identity |
| 94 to 68: | read |
| 98 to 68: | read EA |
| 102 to 68: | read LO |
| 104 to 68: | read MO |
| 104 to 68: | register |
| 108 to 68: | get HUD |
| 108 to 68: | read |
| 108 to 68: | start/stop HUD |
| 118 to 68: | pause/continue |
| 130 to 68: | read CIS |
| 130 to 130: | synchronise CI |
| 132 to 68: | read |

TABLE 5

Figure 5:
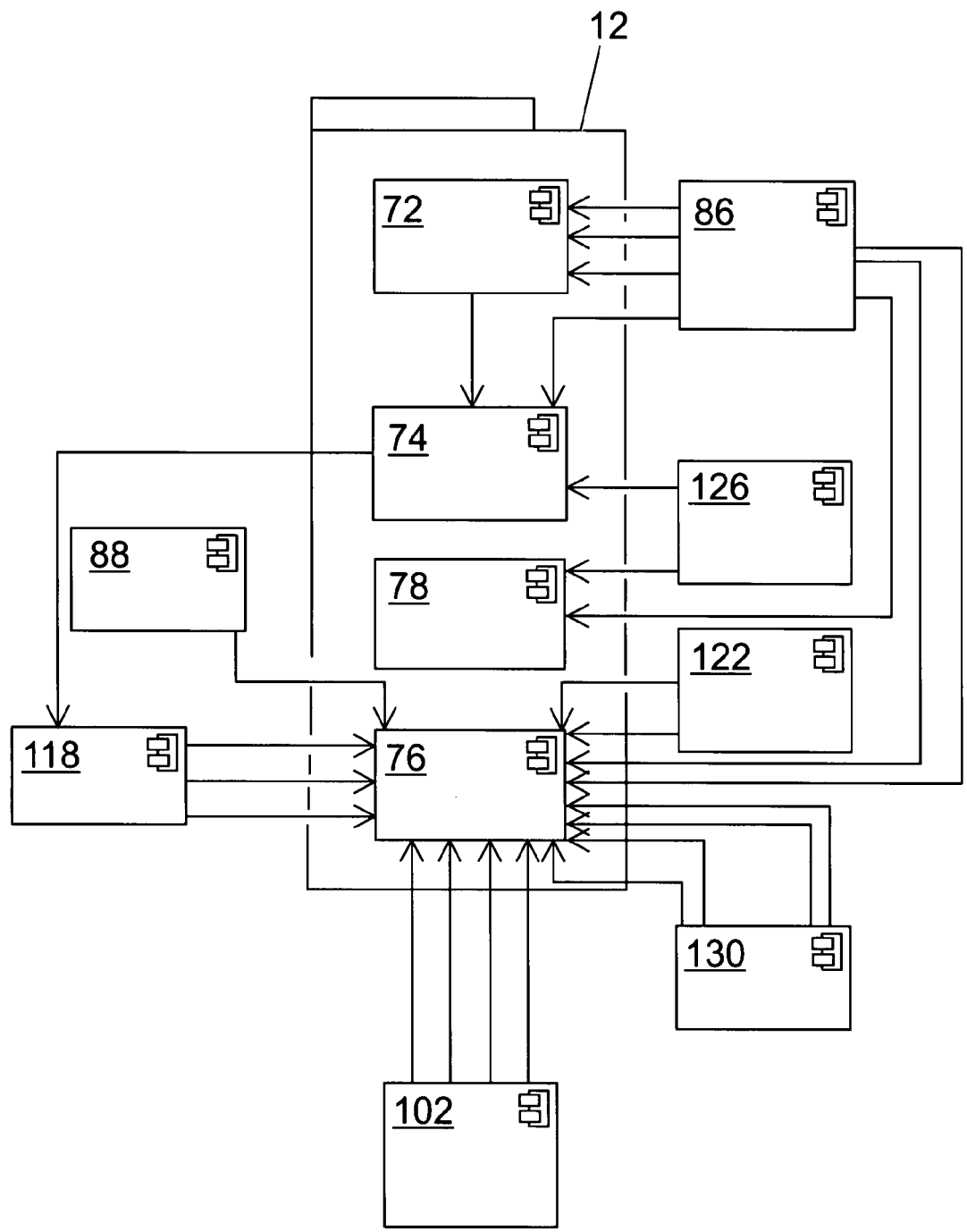
FIG. 5 shows a GBL server functionality component.

Description of Process Flows in FIG. 5

| | |
|---|---|
| 72 to 74: | instantiate |
| 74 to 118: | identify |
| 86 to 78: | leave |
| 86 to 76: | store LAE |
| 86 to 76: | read LAE |
| 86 to 74: | join |
| 86 to 72: | query |
| 86 to 72: | join |
| 86 to 72: | start |
| 88 to 76: | store chat |
| 102 to 76: | install |
| 102 to 76: | assign/unassign |
| 102 to 76: | retrieve |
| 118 to 76: | read profile |
| 118 to 76: | manage profile |
| 118 to 76: | retrieve players/teams |
| 122 to 76: | read |
| 122 to 76: | manage |
| 126 to 78: | leave |
| 126 to 74: | join |
| 130 to 76: | store retrieve/state |
| 130 to 76: | manage CIS |
| 130 to 76: | install |
| 130 to 76: | read |
| 102 to 76: | store |

TABLE 6

Figure 6:
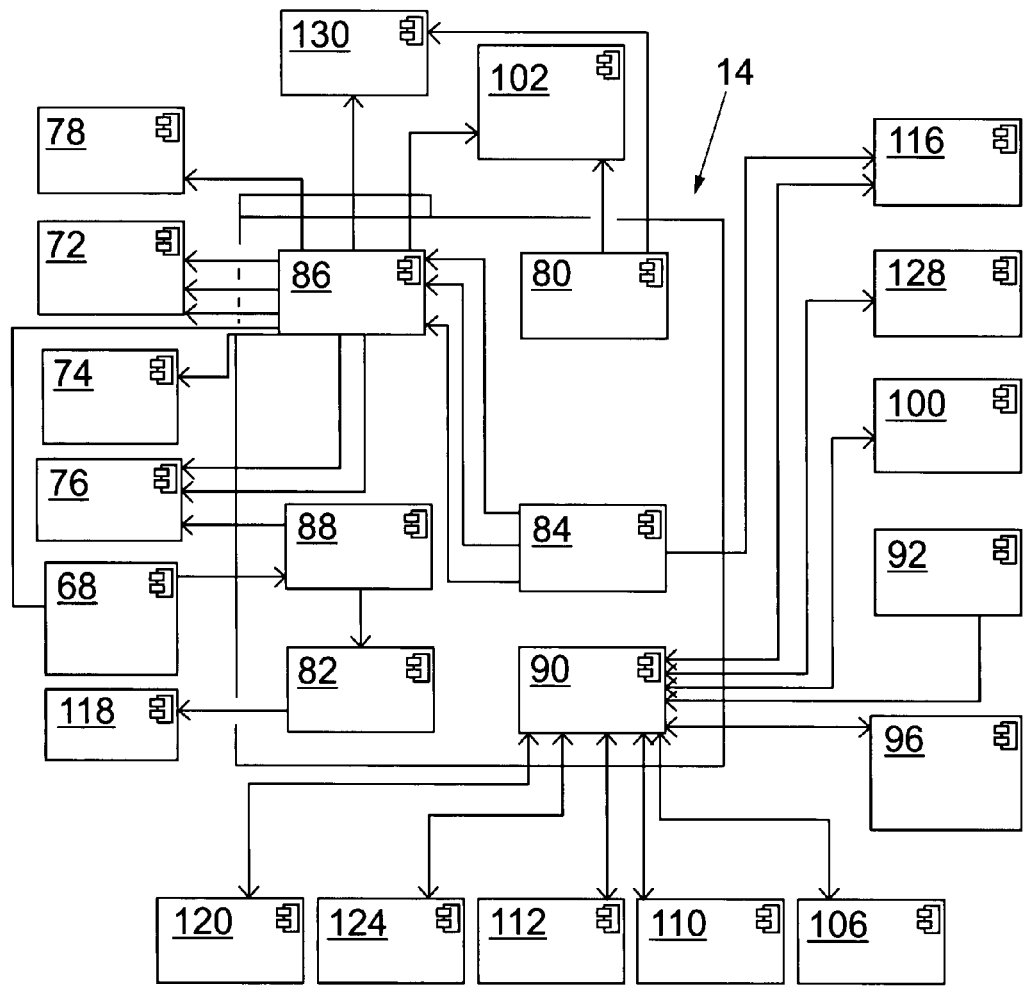
FIG. 6 shows a GBL client core functionality component.

Description of Process Flows in FIG. 6

| | |
|---|---|
| 68 to 88: | record |
| 80 to 130: | install |

TABLE 6-continued

Description of Process Flows in FIG. 6

| | |
|---|---|
| 80 to 102: | install |
| 82 to 118: | query |
| 84 to 86: | access |
| 84 to 86: | manage |
| 84 to 86: | control |
| 84 to 116: | select participants |
| 84 to 90: | transfer focus |
| 86 to 76: | read LAE |
| 86 to 76: | store LAE |
| 86 to 74: | join |
| 86 to 72: | query |
| 86 to 72: | start |
| 86 to 72: | join |
| 86 to 78: | leave |
| 86 to 130: | save/restore |
| 86 to 102: | save/restore |
| 88 to 82: | setup |
| 88 to 76: | store chat |
| 90 to 120: | transfer focus |
| 90 to 124: | transfer focus |
| 90 to 112: | transfer focus |
| 90 to 110: | transfer focus |
| 90 to 106: | transfer focus |
| 90 to 96: | transfer focus |
| 90 to 92: | transfer focus |
| 90 to 100: | transfer focus |
| 90 to 128: | transfer focus |
| 90 to 116: | transfer focus |
| 90 to 84: | transfer focus |
| 92 to 90: | transfer focus |
| 96 to 90: | transfer focus |
| 100 to 90: | transfer focus |
| 106 to 90: | transfer focus |
| 110 to 90: | transfer focus |
| 112 to 90: | transfer focus |
| 116 to 90: | transfer focus |
| 120 to 90: | transfer focus |
| 124 to 90: | transfer focus |
| 128 to 90: | transfer focus |

TABLE 7

Figure 7:
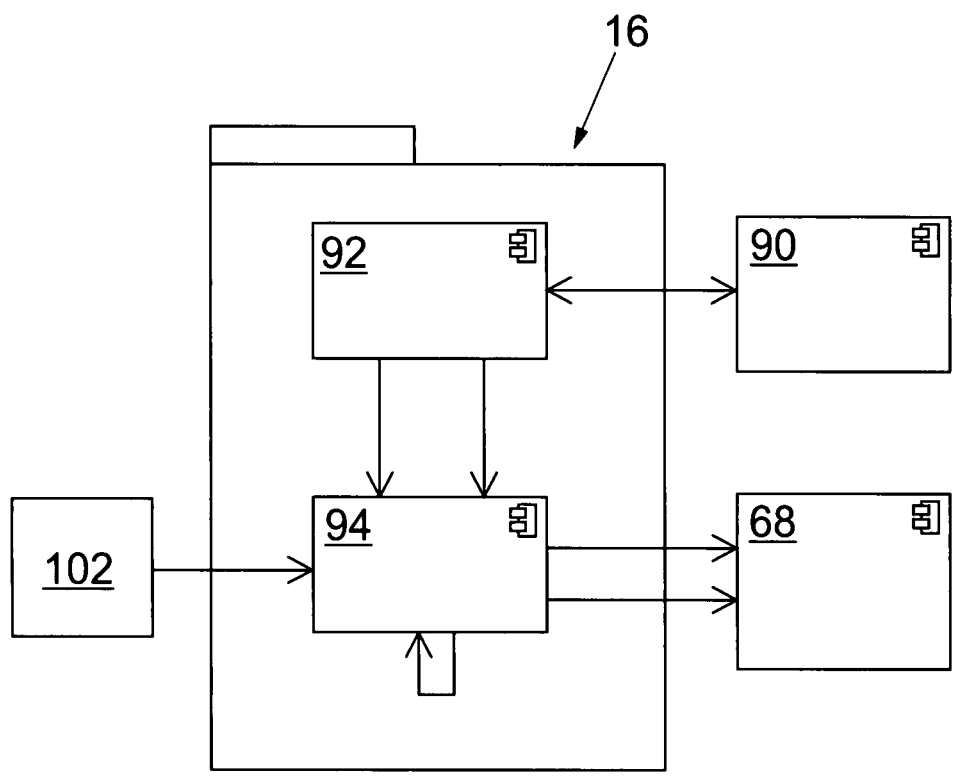
FIG. 7 shows a facilitator control component.

Description of Process Flows in FIG. 7

| | |
|---|---|
| 90 to 92: | transfer focus |
| 92 to 94: | access |
| 92 to 94: | invoke |
| 92 to 90: | transfer focus |
| 94 to 68: | read |
| 94 to 68: | invoke |
| 94 to 94: | send/receive |

TABLE 8

Description of Process Flows in FIG. 8

| | |
|---|---|
| 90 to 96: | transfer focus |
| 96 to 98: | access |
| 96 to 98: | execute |
| 96 to 90: | transfer focus |
| 98 to 118: | pause/continue |
| 98 to 118: | query |
| 98 to 98: | send/receive |
| 98 to 68: | read EA |
| 98 to 96: | notify |
| 118 to 68: | pause/continue |

TABLE 9

Figure 9:
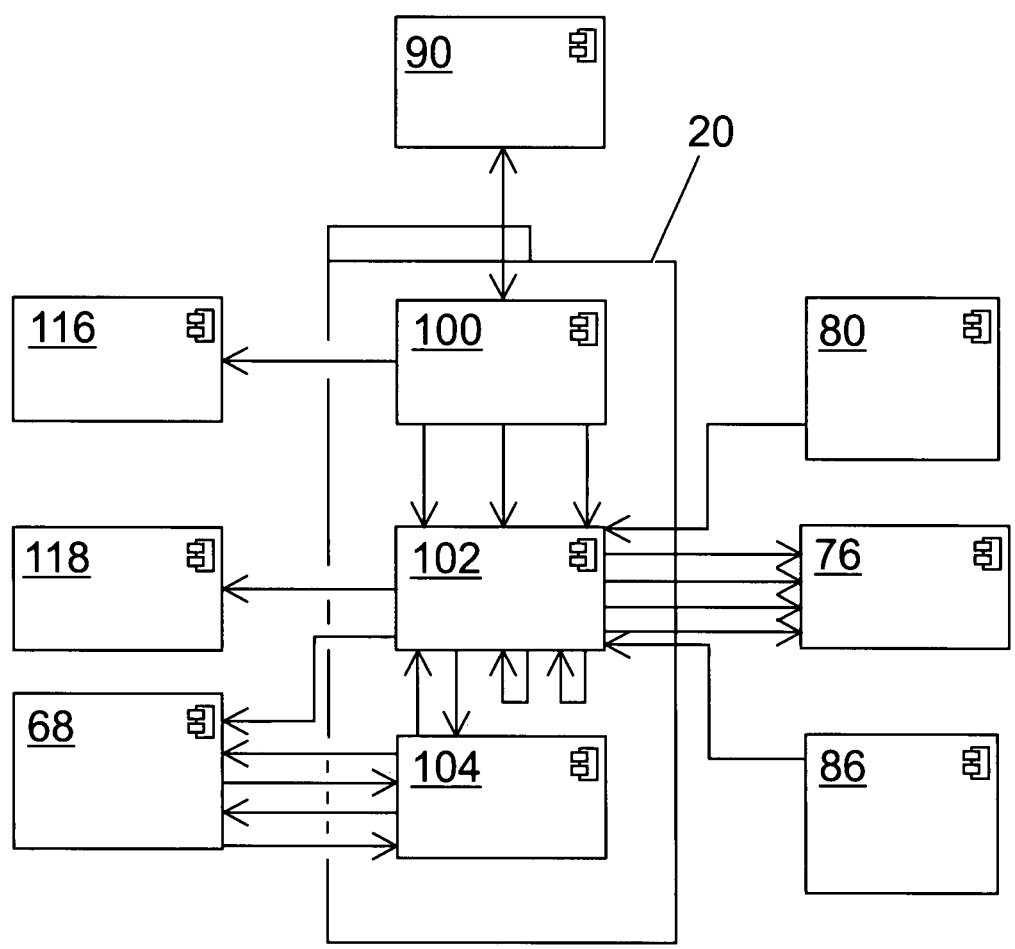
FIG. 9 shows a learning objectives component.

Description of Process Flows in FIG. 9

| | |
|---|---|
| 68 to 104: | measure |
| 68 to 104: | start/stop |
| 80 to 102: | install |
| 86 to 102: | save/restore |
| 90 to 100: | transfer focus |
| 100 to 90: | transfer focus |
| 100 to 116: | select participants |
| 100 to 102: | access |
| 100 to 102: | assign/unassign |
| 100 to 102: | manage |
| 102 to 118: | update |
| 102 to 68: | read LO |
| 102 to 76: | retrieve |
| 102 to 76: | store |
| 102 to 76: | assign/unassign |
| 102 to 76: | install |
| 102 to 102: | evaluate |
| 102 to 102: | send/receive |
| 102 to 104: | access |
| 104 to 102: | register |
| 104 to 68: | read MO |
| 104 to 68: | register |

TABLE 10

Figure 10:
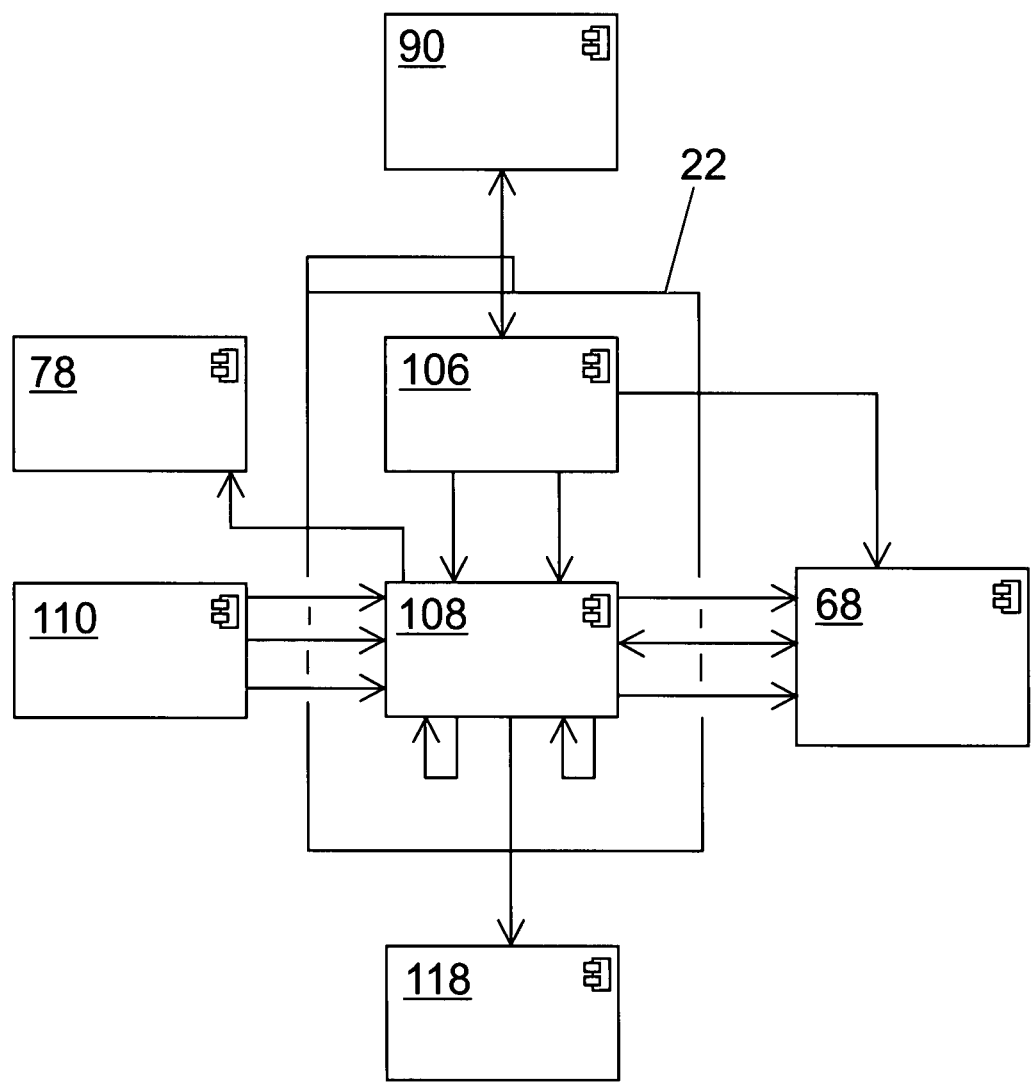
FIG. 10 shows a game view component.

Description of Process Flows in FIG. 10

| | |
|---|---|
| 68 to 108: | get HUD |
| 90 to 106: | transfer focus |
| 106 to 68: | display HUD |
| 106 to 108: | access |
| 106 to 108: | start/stop |
| 106 to 90: | transfer focus |
| 108 to 108: | encode/decode |
| 108 to 108: | send/receive |
| 108 to 68: | start/stop HUD |
| 108 to 68: | read |
| 108 to 68: | get HUD |
| 108 to 118: | get players |
| 108 to 78 | start/stop |
| 110 to 108: | update |
| 110 to 108: | access |
| 110 to 108: | start/stop/clear |

TABLE 11

Figure 11:
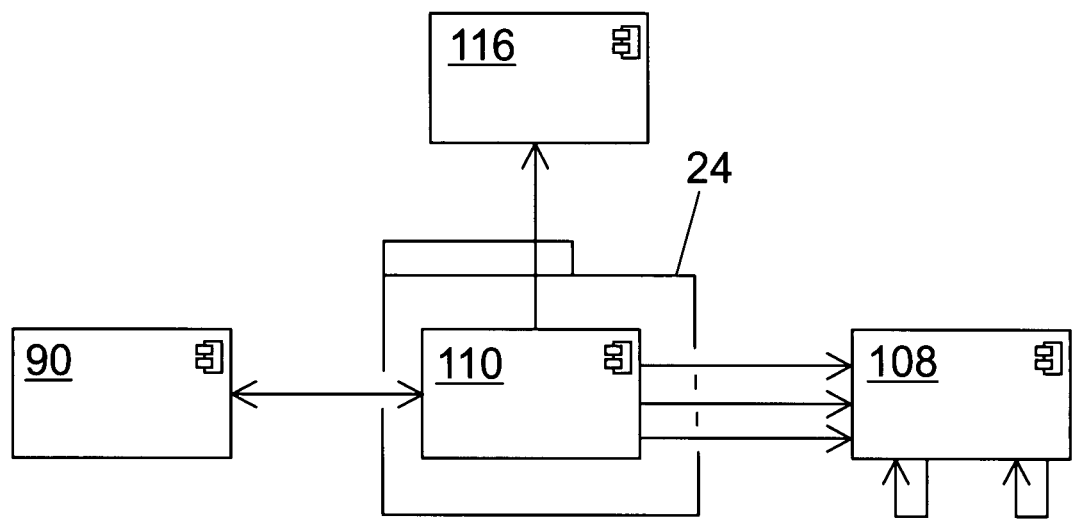
FIG. 11 shows a scribble component.

Description of Process Flows in FIG. 11

| | |
|---|---|
| 90 to 110: | transfer focus |
| 108 to 108: | encode/decode |
| 108 to 108: | send/receive |
| 110 to 116: | select recipients |
| 110 to 90: | transfer focus |
| 110 to 108: | start/stop/clear |
| 110 to 108: | update |
| 110 to 108: | access |

TABLE 12

Figure 12:
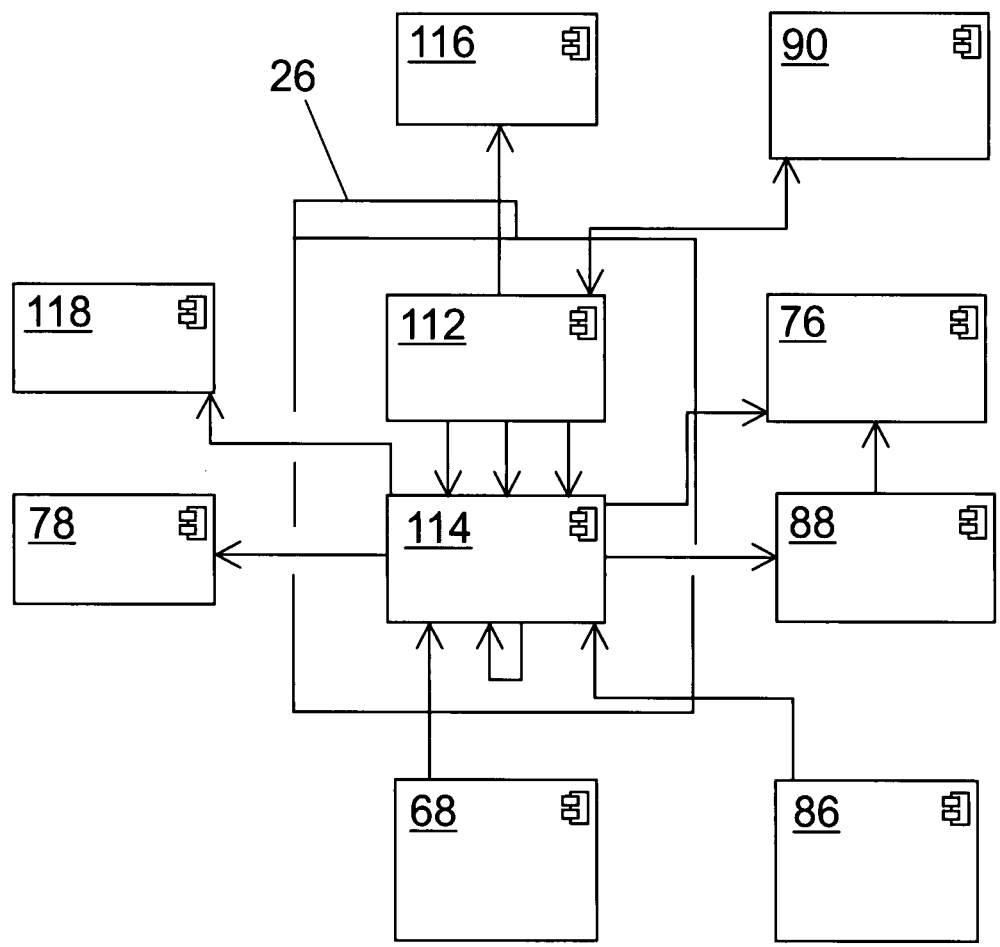
FIG. 12 shows a text communications component.

Description of Process Flows in FIG. 12

| | |
|---|---|
| 68 to 114: | alert |
| 86 to 114: | save/restore |
| 88 to 76: | store chat |
| 90 to 112: | transfer focus |
| 112 to 116: | select recipients |
| 112 to 114: | access |
| 112 to 114: | send |
| 112 to 114: | filter |
| 112 to 90: | transfer focus |
| 114 to 114: | send/receive |

TABLE 12-continued

Description of Process Flows in FIG. 12

| | |
|---|---|
| 114 to 76: | store/retrieve state |
| 114 to 88: | record |
| 114 to 78: | route chat |
| 114 to 118: | identify |

TABLE 13

Figure 13:
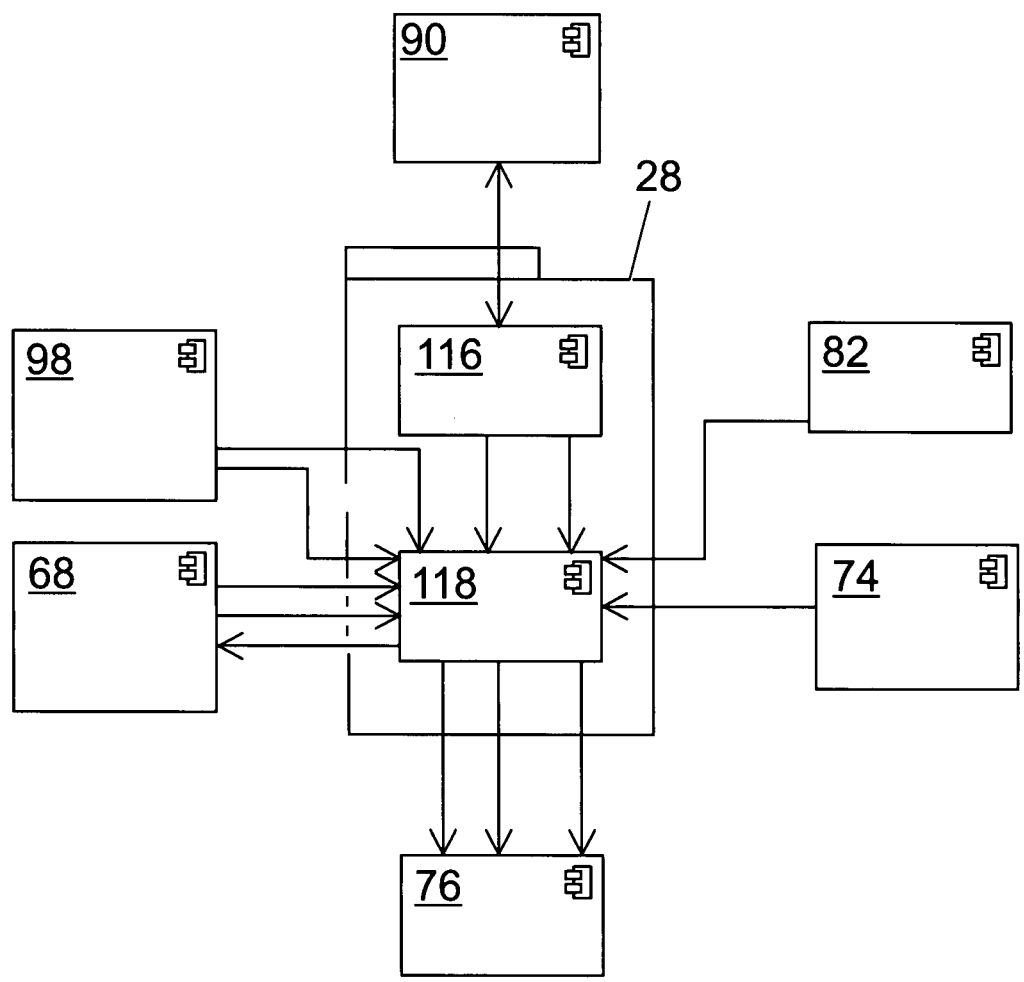
FIG. 13 shows a profiles component.

Description of Process Flows in FIG. 13

| | |
|---|---|
| 68 to 118: | modify |
| 68 to 118: | read profile |
| 74 to 118: | identify |
| 82 to 118: | query |
| 90 to 116: | transfer focus |
| 98 to 118: | query |
| 98 to 118: | pause/continue |
| 116 to 90: | transfer focus |
| 116 to 118: | access |
| 116 to 118: | manage |
| 118 to 76: | retrieve players/teams |
| 118 to 76: | read profile |
| 118 to 76: | manage profile |
| 118 to 68: | pause/continue |

TABLE 14

Description of Process Flows in FIG. 14

| | |
|---|---|
| 30 to 26: | communicate |
| 68 to 122: | initiate |
| 68 to 122: | insert |
| 72 to 74: | instantiate |
| 74 to 118: | identify |
| 90 to 112: | transfer focus |
| 90 to 120: | transfer focus |
| 90 to 124: | transfer focus |
| 98 to 126: | execute |
| 112 to 90: | transfer focus |
| 112 to 114: | send |
| 112 to 114: | access |
| 112 to 114: | filter |
| 114 to 114: | send/receive |
| 114 to 118: | identify |
| 114 to 118: | query users |
| 120 to 116: | select participants |
| 120 to 122: | manage |
| 120 to 122: | initiate |
| 120 to 122: | access |
| 120 to 90: | transfer focus |
| 122 to 76: | read |
| 122 to 76: | manage |
| 122 to 98: | execute |
| 122 to 72: | start |
| 124 to 90: | transfer focus |
| 124 to 126: | control |
| 124 to 126: | access |
| 126 to 78: | leave |
| 126 to 74: | join |
| 126 to 114: | synchronise |
| 126 to 114: | start/end |

TABLE 15

Figure 15:
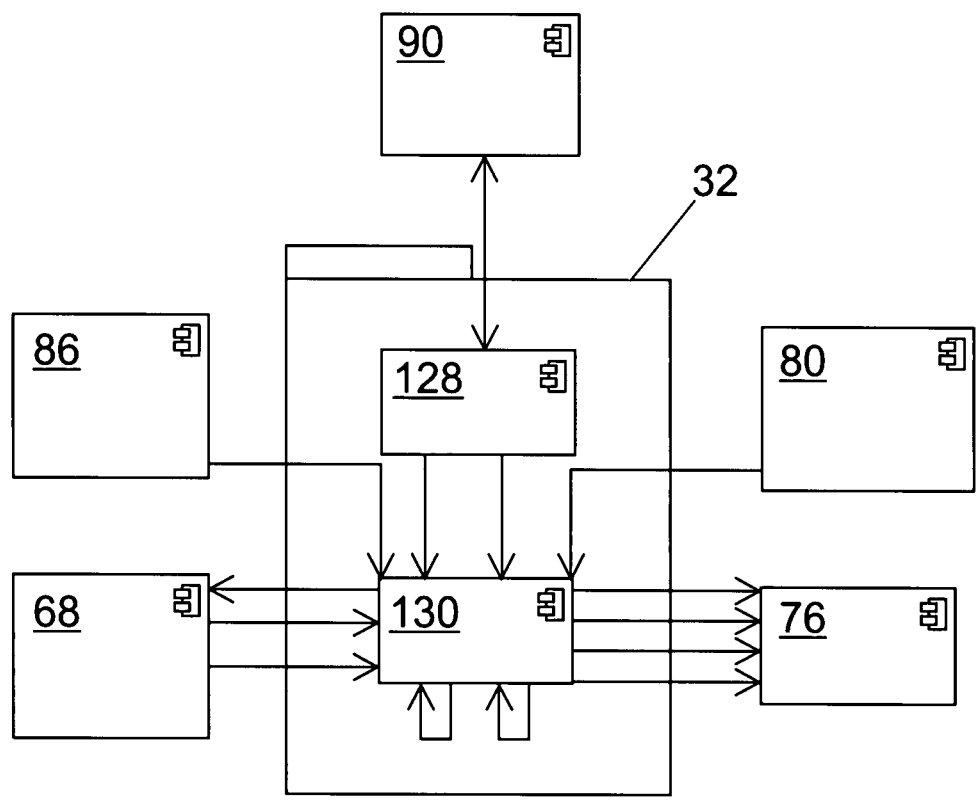
FIG. 15 shows a customisation component.

Description of Process Flows in FIG. 15

| | |
|---|---|
| 68 to 130: | read |
| 68 to 130: | modify |
| 80 to 130: | install |
| 86 to 130: | save/restore |
| 90 to 128: | transfer focus |
| 128 to 90: | transfer focus |

TABLE 15-continued

Description of Process Flows in FIG. 15

| | |
|---|---|
| 128 to 130: | access |
| 128 to 130: | manage |
| 130 to 68: | read CIS |
| 130 to 130: | send/receive |
| 130 to 130: | synchronise CI |
| 130 to 76: | manage CIS |
| 130 to 76: | read |
| 130 to 76: | store/retrieve state |
| 130 to 76: | install |

TABLE 16

Figure 16:
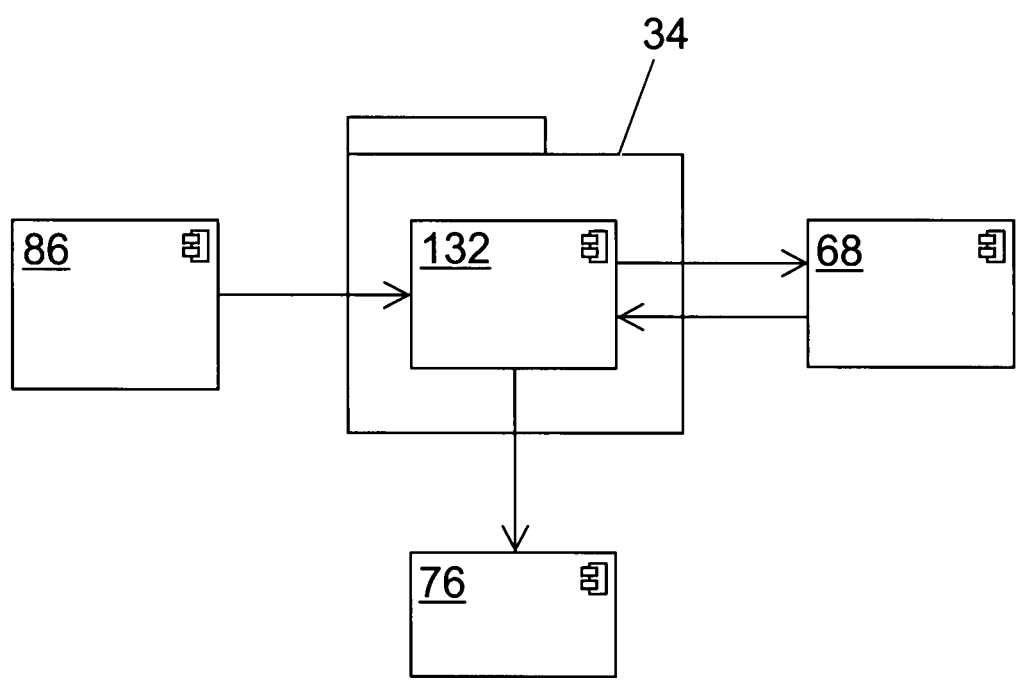
FIG. 16 shows a cues component.

Description of Process Flows in FIG. 16

| | |
|---|---|
| 68 to 132: | update |
| 86 to 132: | save/restore |
| 132 to 68: | read |
| 132 to 76: | store/retrieve state |

The invention claimed is:

1. A system for games-based learning, comprising:
a learning application for execution by a player for the assessment of a learning objective by the performance of a learning application event, said learning application comprising:
learning application measurements which comprise a variable or parameter within the learning application,
measured objectives formed from group of said learning application measurements, and
a set of outcome activities, each of which capable of invoking a command in the learning
application upon an outcome condition being satisfied; and said system further comprising;
a learning objectives component comprising a learning objective controller for customization of the learning application by a facilitator or learning manager by:
selecting one or more of the learning application's measured objectives;
selecting one or more of the learning application's outcome activities; and
defining outcome conditions which specify a predetermined criteria, expressed in terms of measured objectives, which determines when the selected outcome activities should be invoked;
said selected measured objectives, selected outcome activities and defined outcome conditions together defining a learning objective,
wherein the learning objectives component is configured to allow learning managers or facilitators to define their own learning objectives according to their needs and the needs of participants of any given game by selecting, defining and customizing the learning application, and
wherein an assessment of the learning objective is capable of being carried out while the learning application event is running and the learning manager or facilitator uses the learning objectives controller to customize the learning application by adding or modifying a learning objective during the performance of the learning application event by enabling the learning manager or facilitator within a particular game or level of a game to individually change one or more of the learning application's measured objectives, the learning application's outcome activities and the outcome conditions.

2. The system of claim 1, wherein the learning objective controller is operable on the computer of a facilitator for creation of learning objectives for use by a different player or players.

3. The system of claim 1, wherein the learning application is executable on a plurality of players' and/or facilitators' computers, each of which is connected to a server computer or peer-to-peer network which coordinates a multiplayer learning application event.

4. The system of claim 1, wherein the learning application controller permits an assessment of a learning objective, wherein an outcome activity is assessed after the completion of a measured objective.

5. The system of claim 1, wherein the outcome activities are invoked during a learning application event at a point at which an outcome condition is satisfied.

6. The system of claim 1, wherein the outcome activities are invoked by executable logic within the script of the learning application.

7. The system of claim 1, wherein the outcome activities include a command to change at least one item of configurable information within the learning application.

8. The system of claim 7, wherein the configurable information comprises learning application variables or parameters which are enabled for variation.

9. The system of claim 1, wherein a plurality of learning objectives are measured simultaneously during the performance of a learning application event.

10. The system of claim 1, wherein one measured objective contributes to the assessment of a plurality of learning objectives.

11. The system of claim 1, wherein the learning objective controller permits a learning objective to be assigned to a particular player or to a particular team of players.

12. The system of claim 1, wherein once a learning objective has been achieved by a player, a player profile is updated with the results of the performance under that learning objective.

13. The system of claim 1, wherein once a learning objective has been achieved by a team, a team profile is updated with the results of the performance under that learning objective.

14. The system of claim 1, wherein the learning application controller permits a facilitator to perform an assessment of a learning objective and to directly intervene during the performance of a learning application event to invoke a learning application command.

15. The system of claim 1 further comprising a game view component for presenting a real time player screen view to a facilitator.

16. The system of claim 1, further comprising a game controller component that allows a facilitator to take over control of a player's game.

17. The system of claim 1, further comprising a cues component accessible by the facilitator to provide prompts to a player during a learning application event.

18. A non-transitory computer readable medium encoded with a games-based learning application program for execution on a player computer comprising learning application measurements which comprise a variable or parameter within the learning application, measured objectives formed from group of said learning application measurements, and a set of outcome activities, each of which capable of invoking a command in the learning application upon an outcome condition being satisfied;

said learning application being adapted for the assessment of a learning objective by the performance of a learning application event, said learning objective being formed from:
selection of one or more of the learning application's measured objectives;
selection of one or more of the learning application's outcome activities; and
definition of outcome conditions which specify a predetermined criteria, expressed in terms of measured objectives, which determines when the selected outcome activities should be invoked;
wherein the games-based learning application program is part of a system for games-based learning, the system further comprising:
a learning objectives component comprising a learning objective controller for adapting said learning application for the assessment of a learning objective by selecting, defining and adapting the learning application,
wherein the learning objectives component is configured to allow learning managers or facilitators to define their own learning objectives according to their needs and the needs of participants of any given game by said selecting, defining and adapting the learning application, and
wherein an assessment of the learning objective is capable of being carried out while the learning application event is running and the learning manager or facilitator uses the learning objective controller to customize the learning application by adding or modifying a learning objective during the performance of the learning application event by enabling the learning manager or facilitator within a particular game or level of a game to individually change one or more of the learning application's measured objectives, the learning application's outcome activities and the outcome conditions.

19. A computer-implemented method of assessing a player's performance within a learning application program stored on a non-transitory computer-readable medium by the performance of a learning application event, said learning application program comprising learning application measurements which comprise a variable or parameter within the learning application,
a measured objective formed from a group of said learning application measurements, and a set of outcome activities, each of which capable of invoking a command in the learning application upon an outcome condition being satisfied,
said method comprising customizing, via a processor, the learning application program by:
defining, using a computer-implemented program, a learning objective by selecting one or more of the learning application's measured objectives;
selecting, via the processor, one or more of the learning application's outcome activities; and
defining outcome conditions which specify a predetermined criteria, expressed in terms of measured objectives, which determines when the selected outcome activities should be invoked;
said selected measured objectives, selected outcome activities and defined outcome conditions together defining a learning objective; and
defining, using the computer-implemented program, learning objectives according to the needs of learning managers or facilitators and the needs of participants of any given game by selecting, defining and customizing the learning application,
wherein a learning objectives component is provided which is configured to allow the learning manager or facilitator to define their own assessments according to their needs and the needs of participants of any given game by said selecting, defining and customizing the learning application, and
wherein an assessment of the learning objective is capable of being carried out while the learning application event is running and the learning manager or facilitator uses the learning objectives controller to customize the learning application by adding or modifying a learning objective during the performance of the learning application event by enabling the learning manager or facilitator within a particular game or level of a game to individually change one or more of the learning application's measured objectives, the learning application's outcome activities and the outcome conditions.

20. The computer-implemented method of claim 19, wherein a facilitator creates learning objectives for use by a different player or players.

21. The computer-implemented method of claim 19, wherein the learning application is executed on a plurality of players' and/or facilitators' computers, each of which is connected to a server computer or peer-to-peer network which coordinates a multiplayer learning application event.

22. The computer-implemented method of claim 19, further comprising assessing a learning objective by assessing an outcome activity after the completion of a measured objective.

23. The computer-implemented method of claim 19, wherein the outcome activities are invoked during a learning application event at a point at which an outcome condition is satisfied.

24. The computer-implemented method of claim 19, wherein the outcome activities are invoked by executable logic within the script of the learning application.

25. The computer-implemented method of claim 19, wherein the outcome activities include a command to change at least one item of configurable information within the learning application.

26. The computer-implemented method of claim 25, wherein the configurable information comprises learning application variables or parameters which are enabled for variation.

27. The computer-implemented method of claim 19, wherein a plurality of learning objectives are measured simultaneously during the performance of a learning application event.

28. The computer-implemented method of claim 19, wherein one measured objective contributes to the assessment of a plurality of learning objectives.

29. The computer-implemented method of claim 19, wherein a learning objective is assigned to a particular player or to a particular team of players.

30. The computer-implemented method of claim 19, wherein, once a learning objective has been completed by a player, a player profile is updated with the results of the performance under that learning objective.

31. The computer-implemented method of claim 19 wherein, once a learning objective has been completed by a team, a team profile is updated with the results of the performance under that learning objective.

32. The computer-implemented method of claim 19, wherein the facilitator performs an assessment of a learning objective and directly intervenes during the performance of a learning application event to invoke a learning application command.

33. The computer-implemented method of claim 19, further comprising presenting a real time player screen view to a facilitator.

34. The computer-implemented method of claim 19, wherein a facilitator takes over control of a player's game.

35. The computer-implemented method of claim 19, wherein the facilitator accesses a cues component and provides prompts to a player during a learning application event.

36. A computer-implemented method of defining a learning objective for assessment by performance of a learning application event in a learning application program stored on a non-transitory computer-readable medium, said learning application program comprising learning application measurements which comprise a variable or parameter within the learning application, measured objectives formed from group of said learning application measurements, and a set of outcome activities, each of which capable of invoking a command in the learning application upon an outcome condition being satisfied, said method comprising the steps of customizing, via a processor, the learning application by:

selecting one or more of the learning application's measured objectives;

selecting one or more of the learning application's outcome activities; and defining, via the processor, outcome conditions which specify a predetermined criteria, expressed in terms of measured objectives, which determines when the selected outcome activities should be invoked;

said selected measured objectives, selected outcome activities and defined outcome conditions together defining a learning objective; and defining a learning objective according to the needs of learning managers or facilitators and the needs of participants of any given game by selecting, defining and customizing the learning application, wherein a learning objectives component is provided which is configured to allow the learning manager or facilitator to define their own learning objective according to their needs and the needs of participants of any given game by said selecting, defining and customizing the learning application, and wherein an assessment of the learning objective is capable of being carried out while the learning application event is running and the learning manager or facilitator uses the learning objectives controller to customize the learning application by adding or modifying a learning objective during the performance of the learning application event by enabling the learning manager of facilitator within a particular game or level of a game to individually change one or more of the learning application's measured objectives, the learning application's outcome activities and the outcome conditions.

37. The computer-implemented method of claim 36, performed as part of the method for assessing a player's performance within a learning application program stored on a non-transitory computer-readable medium further comprising selecting outcome activities that each invoke a command in the learning application, an outcome activity being invoked when an outcome condition is satisfied.

38. A non-transitory computer readable medium having instructions encoded thereupon that, when run on a computer, provides a system for games-based learning, comprising:

a learning application for execution by a player for the assessment of a learning objective by the performance of a learning application event, said learning application comprising:

learning application measurements which comprise a variable or parameter within the learning application, measured objectives formed from group of said learning application measurements, and a set of outcome activities, each of which capable of invoking a command in the learning application upon an outcome condition being satisfied; and said system further comprising:

a learning objectives component comprising a learning objective controller for customization of the learning application by a facilitator or learning manager by:

selecting one or more of the learning application's measured objectives;

selecting one or more of the learning application's outcome activities; and defining outcome conditions which specify a predetermined criteria, expressed in terms of measured objectives, which determines when the selected outcome activities should be invoked;

said selected measured objectives, selected outcome activities and defined outcome conditions together defining a learning objective, wherein the learning objectives component is configured to allow learning managers or facilitators to define their own learning objectives according to their needs and the needs of participants of any given game by selecting, defining and customizing the learning application, and wherein an assessment of the learning objective is capable of being carried out while the learning application event is running and the learning manager or facilitator uses the learning objective controller to customize the learning application by adding or modifying a learning objective during the performance of the learning application event by enabling the learning manager or facilitator within a particular game or level of a game to individually change one or more of the learning application's measured objectives, the learning application's outcome activities and the outcome conditions.

39. The system of claim 1, wherein the learning application provides an immersive virtual environment to participants.

40. The system of claim 1, wherein the system is an extension of an existing game engine.

41. The system of claim 40, wherein the system interfaces directly with the game engine via scripting.

42. The system of claim 40, wherein the system extends the functionality of the existing game engine to enable the learning application to handle multiple players.

43. The system of claim 40, comprising a learning software development kit which enables a designer to configure all the information and behavior relating to the learning application, the learning application being an extension of an application compliant with said existing game engine.

44. The system of claim 43, wherein the learning software development kit is an extension of a software development kit of the existing game engine.

45. The system of claim 1, wherein the learning application comprises one or more computer controlled game participants and where assessment of a learning objective for a player is made on the basis of said computer-controlled game participants' actions or outcomes.

46. The system of claim 1, wherein the learning manager or facilitator within a particular game or level of a game is enabled to individually change all of the learning application's measured objectives, the learning application's outcome activities and the outcome conditions during the performance of the learning application event.

47. The system of claim 1, operable to allow simulation of working environments and/or situations therefore enabling training for said environments and/or situations.

48. The system of claim 1, being operable to test behavioral and procedural skills.

49. The computer-implemented method of claim 19, wherein the learning application provides an immersive virtual environment to participants.

50. The computer-implemented method of claim 19, comprising a system that comprises the learning application program, wherein the system is an extension of an existing game engine.

51. The computer-implemented method of claim 50, wherein the system interfaces directly with the game engine via scripting.

52. The computer-implemented method of claim 50, wherein the system extends the functionality of the existing game engine to enable the learning application to handle multiple players.

53. The computer-implemented method of claim 50, comprising a learning software development kit to configure all information and behavior relating to the learning application, the learning application being an extension of an application compliant with said existing game engine.

54. The computer-implemented method of claim 53, wherein the learning software development kit is an extension of a software development kit of the existing game engine.

55. The computer-implemented method of claim 19, wherein the learning application comprises one or more computer controlled game participants and where assessment of a learning objective for a player is made on the basis of said computer-controlled game participants' actions or outcomes.

56. The computer-implemented method of claim 19, wherein the learning manager or facilitator within a particular game or level of a game is able to individually change all of the learning application's measured objectives, the learning application's outcome activities and the outcome conditions during the performance of the learning application event.

57. The computer, implemented method of claim 19, wherein the learning application program simulates working environments and/or situations therefore enabling training for said environments and/or situations.

58. The computer-implemented method of claim 19, wherein the learning application program tests behavioral and procedural skills.

59. The computer-implemented method of claim 36, wherein the learning application provides an immersive virtual environment to participants.

* * * * *